United States Patent
Hagey

(10) Patent No.: US 10,438,199 B2
(45) Date of Patent: Oct. 8, 2019

(54) SYSTEMS AND METHODS TO APPLY VALUES FROM STORED VALUE ACCOUNTS TO PAYMENT TRANSACTIONS

(71) Applicant: Visa International Service Association, San Francisco, CA (US)

(72) Inventor: Ryan Hagey, Alameda, CA (US)

(73) Assignee: Visa International Service Association, San Francisco, CA (US)

( * ) Notice: Subject to any disclaimer, the term of this patent is extended or adjusted under 35 U.S.C. 154(b) by 710 days.

(21) Appl. No.: 13/963,665

(22) Filed: Aug. 9, 2013

(65) Prior Publication Data
US 2014/0046744 A1    Feb. 13, 2014

Related U.S. Application Data

(60) Provisional application No. 61/682,180, filed on Aug. 10, 2012.

(51) Int. Cl.
*G06Q 30/02* (2012.01)
*G06Q 20/38* (2012.01)
*G06Q 20/40* (2012.01)

(52) U.S. Cl.
CPC ......... *G06Q 20/387* (2013.01); *G06Q 20/405* (2013.01); *G06Q 30/0241* (2013.01)

(58) Field of Classification Search
None
See application file for complete search history.

(56) References Cited

U.S. PATENT DOCUMENTS

| | | |
|---|---|---|
| 4,941,090 A | 7/1990 | McCarthy |
| 5,025,372 A | 6/1991 | Burton et al. |
| 5,117,355 A | 5/1992 | McCarthy |
| 5,202,826 A | 4/1993 | McCarthy |

(Continued)

FOREIGN PATENT DOCUMENTS

| | | |
|---|---|---|
| CN | 1584894 | 2/2005 |
| JP | 2003502763 | 1/2003 |

(Continued)

OTHER PUBLICATIONS

International Patent Application PCT/US2010/024057, International Search Report & Written Opinion, dated Sep. 28, 2010.

(Continued)

*Primary Examiner* — Sun M Li
*Assistant Examiner* — Thuy N Nguyen
(74) *Attorney, Agent, or Firm* — The Webb Law Firm

(57) ABSTRACT

A system includes a transaction handler configured to communicate with a first issuer processor to maintain a balance of a stored value account, store an offer in association with the stored value account and a consumer account that is under control of a second issuer processor, detect in the consumer account a transaction satisfying requirements of the offer, apply at least a portion of the balance of the stored value account to the transaction, determine a reduced transaction amount for the transaction after applying at least the portion of the balance of the stored value account to the transaction, and communicate with the second issuer processor for an authorization response for the transaction of the reduced transaction amount in the consumer account.

17 Claims, 19 Drawing Sheets

(56) References Cited

U.S. PATENT DOCUMENTS

| | | |
|---|---|---|
| 5,287,268 A | 2/1994 | McCarthy |
| 5,649,118 A | 7/1997 | Carlisle et al. |
| 5,689,100 A | 11/1997 | Carrithers et al. |
| 5,708,422 A | 1/1998 | Blonder et al. |
| 5,774,870 A | 6/1998 | Storey |
| 5,794,118 A | 8/1998 | Yoshinobu |
| 5,794,210 A | 8/1998 | Goldhaber et al. |
| RE36,116 E | 2/1999 | McCarthy |
| 5,923,016 A | 7/1999 | Fredregill et al. |
| 5,937,391 A | 8/1999 | Ikeda et al. |
| 5,956,694 A | 9/1999 | Powell |
| 6,032,136 A | 2/2000 | Brake, Jr. et al. |
| 6,138,911 A | 10/2000 | Fredregill et al. |
| 6,243,687 B1 | 6/2001 | Powell |
| 6,251,017 B1 | 6/2001 | Leason et al. |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,341,353 B1 | 1/2002 | Herman et al. |
| 6,408,286 B1 | 6/2002 | Heiden |
| 6,450,407 B1 | 9/2002 | Freeman et al. |
| 6,594,640 B1 | 7/2003 | Postrel |
| 6,606,745 B2 | 8/2003 | Maggio |
| 6,663,105 B1 | 12/2003 | Sullivan et al. |
| 6,721,743 B1 | 4/2004 | Sakakibara |
| 6,741,968 B2 | 5/2004 | Jacoves et al. |
| 6,748,365 B1 | 6/2004 | Quinlan et al. |
| 6,820,061 B2 | 11/2004 | Postrel |
| 6,829,586 B2 | 12/2004 | Postrel |
| 6,842,739 B2 | 1/2005 | Postrel |
| 6,856,820 B1 | 2/2005 | Kolls |
| 6,865,547 B1 | 3/2005 | Brake, Jr. et al. |
| 6,910,003 B1 | 6/2005 | Arnold et al. |
| 6,915,271 B1 | 7/2005 | Meyer et al. |
| 6,947,898 B2 | 9/2005 | Postrel |
| 6,978,250 B1 | 12/2005 | Kawan et al. |
| 7,054,830 B1 | 5/2006 | Eggleston |
| 7,072,864 B2 | 7/2006 | Brake, Jr. et al. |
| 7,096,190 B2 | 8/2006 | Postrel |
| 7,134,087 B2 | 11/2006 | Bushold et al. |
| 7,143,069 B2 | 11/2006 | Lacivita et al. |
| 7,163,145 B2 | 1/2007 | Cohagan et al. |
| 7,263,507 B1 | 8/2007 | Brake, Jr. et al. |
| 7,370,811 B2 | 5/2008 | Turner et al. |
| 7,376,580 B1 | 5/2008 | Walker et al. |
| 7,398,225 B2 | 7/2008 | Voltmer et al. |
| 7,424,617 B2 | 9/2008 | Boyd et al. |
| 7,428,498 B2 | 9/2008 | Voltmer et al. |
| 7,516,883 B2 | 4/2009 | Hardesty et al. |
| 7,606,730 B2 | 10/2009 | Antonucci |
| 7,624,041 B2 | 11/2009 | Postrel |
| 7,665,660 B2 | 2/2010 | Degliantoni et al. |
| 7,680,688 B2 | 3/2010 | Hessburg et al. |
| 7,686,218 B2 | 3/2010 | Hessburg et al. |
| 7,742,943 B2 | 6/2010 | Postrel |
| 7,753,264 B2 | 7/2010 | Shafer et al. |
| 7,765,124 B2 | 7/2010 | Postrel |
| 7,769,630 B2 | 8/2010 | Postrel |
| 7,777,053 B2 | 8/2010 | Sanganbhatla |
| 7,828,206 B2 | 11/2010 | Hessburg et al. |
| 7,844,490 B2 | 11/2010 | Patterson |
| 7,853,529 B1 | 12/2010 | Walker et al. |
| 7,868,218 B2 | 1/2011 | Clark et al. |
| 7,870,022 B2 | 1/2011 | Bous et al. |
| 7,894,634 B2 | 2/2011 | Chung |
| 7,933,800 B2 | 4/2011 | Main et al. |
| 7,958,030 B2 | 6/2011 | Kemper et al. |
| 8,010,405 B1 | 8/2011 | Bortolin et al. |
| 8,046,256 B2 | 10/2011 | Chien et al. |
| 8,155,999 B2 | 4/2012 | de Boer et al. |
| 8,180,671 B2 | 5/2012 | Cohagan et al. |
| 8,260,788 B2 | 9/2012 | Saito |
| 8,265,993 B2 | 9/2012 | Chien et al. |
| 8,266,031 B2 | 9/2012 | Norris et al. |
| 8,285,643 B2 | 10/2012 | Isaacson et al. |
| 8,301,593 B2 | 10/2012 | Hoffmann |
| 8,302,030 B2 | 10/2012 | Soroca |
| 8,313,023 B1 | 11/2012 | McGhie et al. |
| 8,315,929 B2 | 11/2012 | Allen-Rouman et al. |
| 8,332,290 B1 | 12/2012 | Venturo |
| 8,341,081 B1 | 12/2012 | Wang et al. |
| 8,342,399 B1 | 1/2013 | McGhie et al. |
| 8,401,967 B1 | 3/2013 | Postrel |
| 8,458,016 B1 | 6/2013 | Medina, III et al. |
| 8,463,706 B2 | 6/2013 | Cervenka et al. |
| 8,478,640 B2 | 7/2013 | Postrel |
| 8,511,550 B1 | 8/2013 | McGhie et al. |
| 8,523,054 B2 * | 9/2013 | Yankovich ............ G06Q 30/06 235/379 |
| 8,538,812 B2 | 9/2013 | Ramer et al. |
| 8,612,208 B2 | 12/2013 | Cooper et al. |
| 8,630,989 B2 | 1/2014 | Blohm et al. |
| 8,639,567 B2 | 1/2014 | Winters |
| 8,639,571 B1 | 1/2014 | Leason et al. |
| 8,639,629 B1 | 1/2014 | Hoffman |
| 8,650,124 B2 | 2/2014 | Singh |
| 8,682,715 B1 * | 3/2014 | Cedeno ............... G06Q 20/204 705/14.1 |
| 8,682,791 B2 | 3/2014 | Bies et al. |
| 8,725,568 B2 | 5/2014 | Cervenka et al. |
| 8,732,082 B2 | 5/2014 | Karim |
| 8,880,431 B2 | 11/2014 | Ovick et al. |
| 8,939,356 B2 | 1/2015 | Pourfallah et al. |
| 8,942,992 B1 | 1/2015 | Zhu |
| 8,965,810 B2 | 2/2015 | Cervenka et al. |
| 9,031,859 B2 | 5/2015 | Salmon et al. |
| 9,460,436 B2 | 10/2016 | Ovick et al. |
| 9,495,690 B2 | 11/2016 | Ovick et al. |
| 9,626,678 B2 | 4/2017 | Ovick et al. |
| 2001/0034654 A1 | 10/2001 | L. Vigil et al. |
| 2001/0054003 A1 | 12/2001 | Chien et al. |
| 2002/0013728 A1 | 1/2002 | Wilkman |
| 2002/0026354 A1 | 2/2002 | Shoji et al. |
| 2002/0046116 A1 | 4/2002 | Hohle et al. |
| 2002/0052860 A1 | 5/2002 | Geshwind |
| 2002/0062249 A1 | 5/2002 | Iannacci |
| 2002/0103753 A1 | 8/2002 | Schimmel |
| 2002/0128057 A1 | 9/2002 | Walker et al. |
| 2002/0133467 A1 | 9/2002 | Hobson et al. |
| 2002/0160761 A1 | 10/2002 | Wolfe |
| 2002/0194128 A1 | 12/2002 | Maritzen et al. |
| 2003/0004808 A1 | 1/2003 | Elhaoussine et al. |
| 2003/0040964 A1 | 2/2003 | Lacek |
| 2003/0055727 A1 | 3/2003 | Walker et al. |
| 2003/0091216 A1 | 5/2003 | Silverbrook et al. |
| 2003/0115100 A1 | 6/2003 | Teicher |
| 2003/0120554 A1 | 6/2003 | Hogan et al. |
| 2003/0140004 A1 | 7/2003 | O'Leary et al. |
| 2003/0144907 A1 | 7/2003 | Cohen, Jr. et al. |
| 2003/0144965 A1 | 7/2003 | Prasad et al. |
| 2003/0216967 A1 | 11/2003 | Williams |
| 2003/0225618 A1 | 12/2003 | Hessburg et al. |
| 2003/0225619 A1 | 12/2003 | Dokken et al. |
| 2003/0233439 A1 | 12/2003 | Stone et al. |
| 2003/0236704 A1 | 12/2003 | Antonucci et al. |
| 2003/0236712 A1 | 12/2003 | Antonucci et al. |
| 2004/0024739 A1 | 2/2004 | Copperman et al. |
| 2004/0039693 A1 | 2/2004 | Nauman et al. |
| 2004/0049423 A1 | 3/2004 | Kawashima et al. |
| 2004/0083170 A1 | 4/2004 | Bam et al. |
| 2004/0088216 A1 | 5/2004 | Bangalore |
| 2004/0088376 A1 | 5/2004 | McCanne et al. |
| 2004/0104760 A1 | 6/2004 | Ando |
| 2004/0117250 A1 | 6/2004 | Lubow et al. |
| 2004/0133472 A1 | 7/2004 | Leason et al. |
| 2004/0138949 A1 | 7/2004 | Darnton et al. |
| 2004/0140361 A1 | 7/2004 | Paul et al. |
| 2004/0186773 A1 | 9/2004 | George et al. |
| 2004/0203648 A1 | 10/2004 | Wong |
| 2004/0238622 A1 | 12/2004 | Freiberg |
| 2004/0249710 A1 | 12/2004 | Smith et al. |
| 2004/0249753 A1 * | 12/2004 | Blinn ..................... G06Q 20/10 705/41 |
| 2004/0260608 A1 | 12/2004 | Lewis et al. |

(56) References Cited

U.S. PATENT DOCUMENTS

| | | |
|---|---|---|
| 2005/0010533 A1 | 1/2005 | Cooper |
| 2005/0021399 A1 | 1/2005 | Postrel |
| 2005/0021401 A1 | 1/2005 | Postrel |
| 2005/0060225 A1 | 3/2005 | Postrel |
| 2005/0075932 A1 | 4/2005 | Mankoff |
| 2005/0080727 A1 | 4/2005 | Postrel |
| 2005/0091152 A1 | 4/2005 | Suisa |
| 2005/0096975 A1 | 5/2005 | Moshe |
| 2005/0114213 A1 | 5/2005 | Smith et al. |
| 2005/0119938 A1 | 6/2005 | Smith et al. |
| 2005/0149394 A1 | 7/2005 | Postrel |
| 2005/0205666 A1 | 9/2005 | Ward et al. |
| 2005/0240472 A1 | 10/2005 | Postrel |
| 2005/0240478 A1 | 10/2005 | Lubow et al. |
| 2005/0251469 A1 | 11/2005 | Nandakumar |
| 2005/0267800 A1 | 12/2005 | Tietzen et al. |
| 2006/0010033 A1 | 1/2006 | Thomas |
| 2006/0020511 A1 | 1/2006 | Postrel |
| 2006/0053056 A1 | 3/2006 | Alspach-Goss et al. |
| 2006/0059040 A1 | 3/2006 | Eldred et al. |
| 2006/0111978 A1 | 5/2006 | Tietzen et al. |
| 2006/0129456 A1 | 6/2006 | Walker |
| 2006/0136299 A1 | 6/2006 | Ruhmkork |
| 2006/0161478 A1 | 7/2006 | Turner et al. |
| 2006/0181515 A1 | 8/2006 | Fletcher et al. |
| 2006/0184419 A1 | 8/2006 | Postrel |
| 2006/0190337 A1 | 8/2006 | Ayers, Jr. |
| 2006/0206376 A1 | 9/2006 | Gibbs et al. |
| 2006/0208064 A1 | 9/2006 | Mendelovich et al. |
| 2006/0208065 A1 | 9/2006 | Mendelovich et al. |
| 2006/0253321 A1 | 11/2006 | Heywood |
| 2006/0253392 A1 | 11/2006 | Davies |
| 2006/0259364 A1 | 11/2006 | Strock et al. |
| 2006/0259390 A1 | 11/2006 | Rosenberger |
| 2006/0261149 A1 | 11/2006 | Raghavendra Tulluri |
| 2006/0277103 A1 | 12/2006 | Fujita et al. |
| 2006/0278697 A1 | 12/2006 | Lovett |
| 2006/0287943 A1 | 12/2006 | Postrel |
| 2007/0005416 A1 | 1/2007 | Jackson et al. |
| 2007/0005510 A1 | 1/2007 | Bloodworth et al. |
| 2007/0011044 A1 | 1/2007 | Hansen |
| 2007/0038515 A1 | 2/2007 | Postrel |
| 2007/0043613 A1 | 2/2007 | Longest |
| 2007/0043619 A1 | 2/2007 | Leason et al. |
| 2007/0043620 A1 | 2/2007 | Leason et al. |
| 2007/0078719 A1 | 4/2007 | Schmitt et al. |
| 2007/0100691 A1 | 5/2007 | Patterson et al. |
| 2007/0105536 A1 | 5/2007 | Tingo, Jr. |
| 2007/0112629 A1 | 5/2007 | Solomon |
| 2007/0129955 A1 | 6/2007 | Dalmia et al. |
| 2007/0129998 A1 | 6/2007 | Postrel |
| 2007/0130011 A1 | 6/2007 | Postrel |
| 2007/0143178 A1 | 6/2007 | Citrin et al. |
| 2007/0168354 A1 | 7/2007 | Ramer et al. |
| 2007/0192784 A1 | 8/2007 | Postrel |
| 2007/0198338 A1 | 8/2007 | Heywood |
| 2007/0214049 A1 | 9/2007 | Postrel |
| 2007/0226059 A1 | 9/2007 | Postrel |
| 2007/0260509 A1 | 11/2007 | Hines et al. |
| 2007/0288313 A1 | 12/2007 | Brodson |
| 2007/0299742 A1 | 12/2007 | Williams et al. |
| 2008/0010154 A1 | 1/2008 | Tietzen et al. |
| 2008/0011820 A1 | 1/2008 | Brown et al. |
| 2008/0011837 A1 | 1/2008 | Wesley |
| 2008/0021784 A1 | 1/2008 | Hessburg et al. |
| 2008/0040222 A1 | 2/2008 | Gee |
| 2008/0040270 A1 | 2/2008 | Buchheit et al. |
| 2008/0059303 A1 | 3/2008 | Fordyce, III |
| 2008/0071587 A1 | 3/2008 | Granucci et al. |
| 2008/0071640 A1 | 3/2008 | Nguyen |
| 2008/0077499 A1 | 3/2008 | Ariff et al. |
| 2008/0103968 A1 | 5/2008 | Bies et al. |
| 2008/0120221 A1 | 5/2008 | Toneguzzo |
| 2008/0133350 A1 | 6/2008 | White et al. |
| 2008/0133351 A1* | 6/2008 | White .................. G06Q 20/387 705/14.27 |
| 2008/0147496 A1 | 6/2008 | Bal et al. |
| 2008/0147534 A1 | 6/2008 | Ephrati et al. |
| 2008/0154676 A1 | 6/2008 | Suk |
| 2008/0154702 A1* | 6/2008 | Pleban .................. G06Q 30/02 705/14.53 |
| 2008/0154722 A1 | 6/2008 | Galinos |
| 2008/0177627 A1 | 7/2008 | Cefail |
| 2008/0195528 A1 | 8/2008 | Keithley |
| 2008/0201224 A1 | 8/2008 | Owens et al. |
| 2008/0201226 A1 | 8/2008 | Carlson et al. |
| 2008/0210753 A1 | 9/2008 | Plozay et al. |
| 2008/0217397 A1 | 9/2008 | Degliantoni et al. |
| 2008/0221986 A1 | 9/2008 | Soicher et al. |
| 2008/0222049 A1 | 9/2008 | Loomis et al. |
| 2008/0228563 A1 | 9/2008 | Zellner et al. |
| 2008/0228583 A1 | 9/2008 | MacDonald et al. |
| 2008/0230600 A1 | 9/2008 | Black et al. |
| 2008/0249861 A1 | 10/2008 | Carotta et al. |
| 2008/0270246 A1 | 10/2008 | Chen |
| 2008/0301001 A1 | 12/2008 | Baumgartner, IV et al. |
| 2008/0313034 A1 | 12/2008 | Wise |
| 2008/0313044 A1 | 12/2008 | Aaltonen et al. |
| 2009/0006203 A1 | 1/2009 | Fordyce, III |
| 2009/0018909 A1 | 1/2009 | Grecia |
| 2009/0030793 A1 | 1/2009 | Fordyce, III |
| 2009/0048884 A1 | 2/2009 | Olives et al. |
| 2009/0048916 A1 | 2/2009 | Nuzum et al. |
| 2009/0076911 A1 | 3/2009 | Vo et al. |
| 2009/0076912 A1 | 3/2009 | Rajan et al. |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112721 A1 | 4/2009 | Hammad et al. |
| 2009/0150235 A1 | 6/2009 | Blythe |
| 2009/0176580 A1 | 7/2009 | Herrmann et al. |
| 2009/0198572 A1 | 8/2009 | Jurgens |
| 2009/0240627 A1 | 9/2009 | Rodriguez et al. |
| 2009/0271262 A1 | 10/2009 | Hammad |
| 2009/0292595 A1 | 11/2009 | Tonnison et al. |
| 2009/0307118 A1 | 12/2009 | Baumgartner, IV |
| 2009/0307130 A1 | 12/2009 | Tan |
| 2009/0313109 A1 | 12/2009 | Bous et al. |
| 2010/0010901 A1 | 1/2010 | Marshall et al. |
| 2010/0030688 A1 | 2/2010 | Patterson |
| 2010/0042517 A1 | 2/2010 | Paintin et al. |
| 2010/0051691 A1 | 3/2010 | Brooks et al. |
| 2010/0057551 A1 | 3/2010 | Blaisdell |
| 2010/0057553 A1 | 3/2010 | Ameiss et al. |
| 2010/0070376 A1 | 3/2010 | Proud et al. |
| 2010/0075551 A1 | 3/2010 | Blaisdell |
| 2010/0075638 A1 | 3/2010 | Carlson |
| 2010/0076820 A1 | 3/2010 | Davis |
| 2010/0100484 A1 | 4/2010 | Nguyen et al. |
| 2010/0106598 A1 | 4/2010 | Grimes |
| 2010/0125737 A1 | 5/2010 | Kang |
| 2010/0145855 A1 | 6/2010 | Fordyce, III et al. |
| 2010/0161404 A1 | 6/2010 | Taylor et al. |
| 2010/0169215 A1 | 7/2010 | Balasubramanian et al. |
| 2010/0174596 A1 | 7/2010 | Gilman et al. |
| 2010/0211445 A1 | 8/2010 | Bodington |
| 2010/0211469 A1 | 8/2010 | Salmon |
| 2010/0223145 A1 | 9/2010 | Dragt |
| 2010/0274626 A1 | 10/2010 | Carlson |
| 2010/0274659 A1 | 10/2010 | Antonucci et al. |
| 2010/0280892 A1 | 11/2010 | Uzunalioglu et al. |
| 2010/0291895 A1 | 11/2010 | Drzyzga et al. |
| 2010/0299194 A1 | 11/2010 | Snyder et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1 | 1/2011 | Strock et al. |
| 2011/0022514 A1 | 1/2011 | Lal et al. |
| 2011/0035278 A1 | 2/2011 | Fordyce, III et al. |

(56) References Cited

U.S. PATENT DOCUMENTS

| | | |
|---|---|---|
| 2011/0047019 A1 | 2/2011 | Cervenka |
| 2011/0047023 A1 | 2/2011 | Lieblang et al. |
| 2011/0066483 A1 | 3/2011 | Salmon et al. |
| 2011/0082739 A1 | 4/2011 | Purfallah |
| 2011/0087530 A1 | 4/2011 | Fordyce, III |
| 2011/0087531 A1* | 4/2011 | Winters ............ G06Q 20/10 705/14.17 |
| 2011/0103586 A1 | 5/2011 | Nobre |
| 2011/0125565 A1 | 5/2011 | MacIlwaine et al. |
| 2011/0145148 A1 | 6/2011 | Hammad |
| 2011/0161230 A1 | 6/2011 | Singh |
| 2011/0191417 A1 | 8/2011 | Rathod |
| 2011/0218868 A1 | 9/2011 | Young et al. |
| 2011/0231258 A1 | 9/2011 | Winters et al. |
| 2011/0238483 A1 | 9/2011 | Yoo et al. |
| 2011/0264567 A1 | 10/2011 | Clyne |
| 2011/0276493 A1 | 11/2011 | Graham, III et al. |
| 2011/0276495 A1 | 11/2011 | Varadarajan et al. |
| 2011/0288918 A1 | 11/2011 | Cervenka |
| 2011/0288924 A1 | 11/2011 | Thomas et al. |
| 2011/0295675 A1 | 12/2011 | Reodica |
| 2012/0010940 A1 | 1/2012 | Masi |
| 2012/0016728 A1 | 1/2012 | Ahmad et al. |
| 2012/0035998 A1 | 2/2012 | Chien et al. |
| 2012/0041812 A1 | 2/2012 | Postrel |
| 2012/0054000 A1 | 3/2012 | Boppert et al. |
| 2012/0101881 A1 | 4/2012 | Taylor et al. |
| 2012/0101894 A1 | 4/2012 | Sterling et al. |
| 2012/0123849 A1 | 5/2012 | Armstrong |
| 2012/0130705 A1 | 5/2012 | Sun et al. |
| 2012/0150669 A1 | 6/2012 | Langley et al. |
| 2012/0179531 A1 | 7/2012 | Kim |
| 2012/0191525 A1 | 7/2012 | Singh |
| 2012/0215610 A1 | 8/2012 | Amaro et al. |
| 2012/0215614 A1 | 8/2012 | Hochstatter et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0233074 A1 | 9/2012 | Dangott et al. |
| 2012/0239477 A1 | 9/2012 | Cueli |
| 2012/0245987 A1 | 9/2012 | Isaacson |
| 2012/0267432 A1 | 10/2012 | Kuttuva |
| 2012/0271689 A1 | 10/2012 | Etheredge et al. |
| 2012/0271691 A1 | 10/2012 | Hammand Ayman et al. |
| 2012/0271697 A1 | 10/2012 | Gilman et al. |
| 2012/0284187 A1 | 11/2012 | Hammad et al. |
| 2012/0290420 A1 | 11/2012 | Close |
| 2012/0290950 A1 | 11/2012 | Rapaport |
| 2012/0303425 A1 | 11/2012 | Katzin et al. |
| 2012/0316945 A1 | 12/2012 | Wolf et al. |
| 2012/0323663 A1 | 12/2012 | Leach |
| 2012/0323765 A1* | 12/2012 | Spaulding ........ G06Q 20/35785 705/39 |
| 2013/0006848 A1 | 1/2013 | Kuttuva |
| 2013/0054336 A1 | 2/2013 | Graylin |
| 2013/0060679 A1 | 3/2013 | Oskolkov et al. |
| 2013/0066735 A1* | 3/2013 | Llach ................ G06Q 20/28 705/21 |
| 2013/0091000 A1 | 4/2013 | Hagey et al. |
| 2013/0124278 A1 | 5/2013 | Najm |
| 2013/0124287 A1 | 5/2013 | Bjorn et al. |
| 2013/0132283 A1 | 5/2013 | Hayhow et al. |
| 2013/0151323 A1 | 6/2013 | Shepard et al. |
| 2013/0151401 A1 | 6/2013 | Scipioni et al. |
| 2013/0197991 A1 | 8/2013 | Basu et al. |
| 2013/0246150 A1 | 9/2013 | Ovick et al. |
| 2013/0246273 A1 | 9/2013 | Ovick et al. |
| 2013/0254004 A1 | 9/2013 | Cervenka et al. |
| 2013/0254008 A1 | 9/2013 | Ovick et al. |
| 2013/0268333 A1 | 10/2013 | Ovick et al. |
| 2013/0282586 A1 | 10/2013 | Ovick et al. |
| 2013/0325579 A1 | 12/2013 | Salmon et al. |
| 2013/0339167 A1 | 12/2013 | Taylor et al. |
| 2013/0346191 A1 | 12/2013 | Morris et al. |
| 2014/0040051 A1 | 2/2014 | Ovick et al. |
| 2014/0040135 A1 | 2/2014 | Ovick et al. |
| 2014/0129308 A1 | 5/2014 | Rappoport |
| 2014/0129314 A1 | 5/2014 | Kim |
| 2014/0180826 A1 | 6/2014 | Boal |
| 2014/0214661 A1* | 7/2014 | Yankovich ........ G06Q 30/06 705/40 |
| 2014/0229260 A1 | 8/2014 | Cervenka et al. |
| 2014/0229319 A1 | 8/2014 | Roberts et al. |
| 2014/0310080 A1 | 10/2014 | Salmon et al. |
| 2015/0019314 A1 | 1/2015 | Salmon et al. |
| 2015/0019435 A1 | 1/2015 | Ovick et al. |
| 2015/0106185 A1 | 4/2015 | Cervenka et al. |
| 2016/0358197 A1 | 12/2016 | Ovick et al. |
| 2017/0039560 A1 | 2/2017 | Ovick et al. |
| 2017/0178143 A1 | 6/2017 | Ovick et al. |

FOREIGN PATENT DOCUMENTS

| | | |
|---|---|---|
| JP | 2004303015 | 10/2004 |
| KR | 20010083521 | 9/2001 |
| KR | 20010096673 | 11/2001 |
| KR | 1020020050219 | 6/2002 |
| KR | 20030080111 | 10/2003 |
| KR | 1020040016771 | 2/2004 |
| KR | 20040028110 | 4/2004 |
| KR | 1020040040253 | 5/2004 |
| KR | 1020040077077 | 9/2004 |
| KR | 1020050061661 | 6/2005 |
| KR | 20060101241 | 9/2006 |
| KR | 100717590 | 5/2007 |
| KR | 1020070110241 | 11/2007 |
| KR | 100836484 | 6/2008 |
| KR | 20080102439 | 11/2008 |
| MX | PA1013136 | 6/2004 |
| WO | 2000079461 | 12/2000 |
| WO | 2001039053 | 5/2001 |
| WO | 2000049551 | 5/2002 |
| WO | 2006121541 | 11/2006 |
| WO | 2008016923 | 2/2008 |
| WO | 2008102935 | 8/2008 |
| WO | 2009061019 | 5/2009 |
| WO | 2010093893 | 8/2010 |
| WO | 2010135642 | 11/2010 |
| WO | 2011028486 | 3/2011 |
| WO | 2013138756 | 9/2013 |
| ZA | 200200475 | 6/2003 |

OTHER PUBLICATIONS

International Patent Application PCT/US2010/035769, International Search Report and Written Opinion, dated Jan. 12, 2011.
International Patent Application PCT/US2010/037646, International Search Report and Written Opinion, dated Jan. 18, 2011.
International Patent Application PCT/US2010/046360, International Seach Report and Written Opinion, dated Mar. 30, 2011.
International Patent Application PCT/US2012/059607, International Search Report and Written Opinion, dated Mar. 15, 2013.
International Patent Application PCT/US2012/068541, International Search Report and Written Opinion, dated Mar. 20, 2013.
International Patent Application PCT/US2013/023642 International Search Report and Written Opinion, dated May 30, 2013.
International Patent Application PCT/US2013/032307 International Search Report and Written Opinion, dated Jun. 26, 2013.
International Patent Application PCT/US12/59607, International Preliminary Report on Patentability, dated Apr. 15, 2014.
International Patent Application PCT/US12/68541, International Preliminary Report on Patentability, dated Jun. 10, 2014.
International Patent Application PCT/US13/23642, International Preliminary Report on Patentability, dated Aug. 5, 2014.
Simon, Jeremy M., Credit card companies promote no-signature Transactions, Published on Oct. 17, 2006. Accessed on Apr. 15, 2016, from http://www.creditcards.com/credit-card-news/popular-credit-card-introduce-no-signature-cards-1273.php.

(56) References Cited

OTHER PUBLICATIONS

ISO8583—A layman's guide to understanding the ISO8583 Financial Transaction Message, Mar. 11, 2008; retrieved from http://www.lytsing.org/downloads/iso8583.pdf.

* cited by examiner

SYSTEMS AND METHODS TO APPLY VALUES FROM STORED VALUE ACCOUNTS TO PAYMENT TRANSACTIONS

CROSS-REFERENCE TO RELATED APPLICATIONS

The present application claims priority to Prov. U.S. Pat. App. Ser. No. 61/682,180, filed Aug. 10, 2012 and entitled "Systems and Methods to Apply Values from Stored Value Accounts to Payment Transactions," the entire disclosure of which application is hereby incorporated herein by reference.

The present application relates to U.S. patent application Ser. No. 13/804,435, filed Mar. 14, 2013 and entitled "Systems and Methods to Apply the Benefit of Offers via a Transaction Handler", U.S. patent application Ser. No. 13/648,849, filed Oct. 10, 2012, assigned U.S. Pat. App. Pub. No. 2013-0091000, and entitled "Systems and Methods to Provide Discount at Point of Sales Terminals," and U.S. Pat. App. Pub. No. 2011/0125565, published May 26, 2011 and entitled "Systems and Methods for Multi-Channel Offer Redemption," the disclosures of which applications are hereby incorporated herein by reference.

FIELD OF THE TECHNOLOGY

At least some embodiments of the present disclosure relate to the processing of payment transactions, such as payments made via credit cards, debit cards, prepaid cards, etc., and the redemption of the benefits of offers, such as coupons, deals, discounts, rewards, etc.

BACKGROUND

Millions of transactions occur daily through the use of payment cards, such as credit cards, debit cards, prepaid cards, etc. Payment processing systems, involving acquirer systems, issuer systems, transaction handlers to interconnect the acquirer systems and issuer systems, etc., have been developed to facilitate secure and efficient communications among parties involved in the payment transactions.

For example, U.S. Pat. App. Pub. No. 2009/0271262, published Oct. 28, 2009, discloses a first authorization request generated to include split payment data. After the first authorization request message is analyzed using a server computer, a second authorization request message is sent to a first service provider, and a third authorization request message is sent to a second service provider, to facilitate the split payment according to the split payment data.

Offers, such as coupons, deals, discounts, rewards, etc., typically involve benefits that are provided to the recipients of the offers after the redemption requirements of the respective offers are satisfied. A typical requirement involves the purchase of a product or service relevant to the corresponding offer.

Processing payments and offers using substantially separate systems have drawbacks, such as inefficient use of computation resources for security measures and processing, duplicative allocation of computation resources for the separate systems, time delay from the time when redemption requirements of offers are satisfied and the completion of the provisioning of the benefits of the offers, etc.

Some systems have been developed to at least partially integrate the payment processing and the offer processing. For example, U.S. Pat. App. Pub. No. 2011/0125565, published May 26, 2011, discloses a system to associate an offer with an account of a user in a data warehouse, in which a transaction handler is configured to identify a payment transaction in the account for a purchase eligible for the redemption of the offer. If the payment transaction is identified, the transaction handler provides the benefit of the offer to the account of the user via statement credits. For example, U.S. Pat. App. Pub. No. 2009/0112721, published Oct. 28, 2009, discloses a Value-Added Service Engine programmed to determine a benefit associated with a product after receiving transaction information identifying the product and after communicating with a supplier of the product.

U.S. Pat. App. Pub. No. 2010/0312626, published Dec. 9, 2010, discloses a transaction handler configured to receive an authorization request for a discount associated with an electronic coupon for a purchase. The electronic coupon has been received by the merchant to give the discount on a purchase by a consumer. The discount is to be debited from the sponsor account and credited to an account of the merchant.

U.S. Pat. App. Pub. No. 2011/0047019, published Feb. 24, 2011, discloses a transaction handler configured to forward a coupon authorization request message, identifying a sponsor account and a coupon, from a merchant's acquirer to a sponsor account's issuer, and when the coupon is eligible, to forward the corresponding authorization response from the issuer to the acquirer.

U.S. Pat. App. Pub. No. 2008/0133351, published Jun. 5, 2008, discloses a "Method and Apparatus for Reward Messaging, Discounting and Redemption at the Point of Interaction," in which, upon determining that the transaction is eligible for a discount, the authorization request message is updated to indicate that it is a discount transaction, and this updated authorization request message is then forwarded to the issuer (or issuer processor) for authorization. When a promo code is used by the POS terminal or merchant system to apply or calculate a discount amount at the point of interaction, the full transaction price may be authorized by the issuer, and full transaction price less the discount amount is then cleared and settled between the acquirer and the issuer after the transaction. When a promo code is not used, the authorization system forwards an authorization request message to the issuer for the purchase amount less the discount.

U.S. Pat. App. Pub. No. 2007/0011044, published Jan. 11, 2007, discloses a host system configured to transmit an authorization request to a credit provider. After discounts available for application to the transaction are identified with the host system and from the identifier of a credit instrument, a modified transaction having a total transaction cost reduced by application of at least one of the separate discounts is coordinated between the host system and the merchant.

The disclosures of the above discussed patent documents are hereby incorporated herein by reference.

The present application includes systems and methods configured to further improve the overall system performances, including interoperability, transaction integrity, efficiency in processing payments in combination with offers, time delay in processing, resource allocation, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
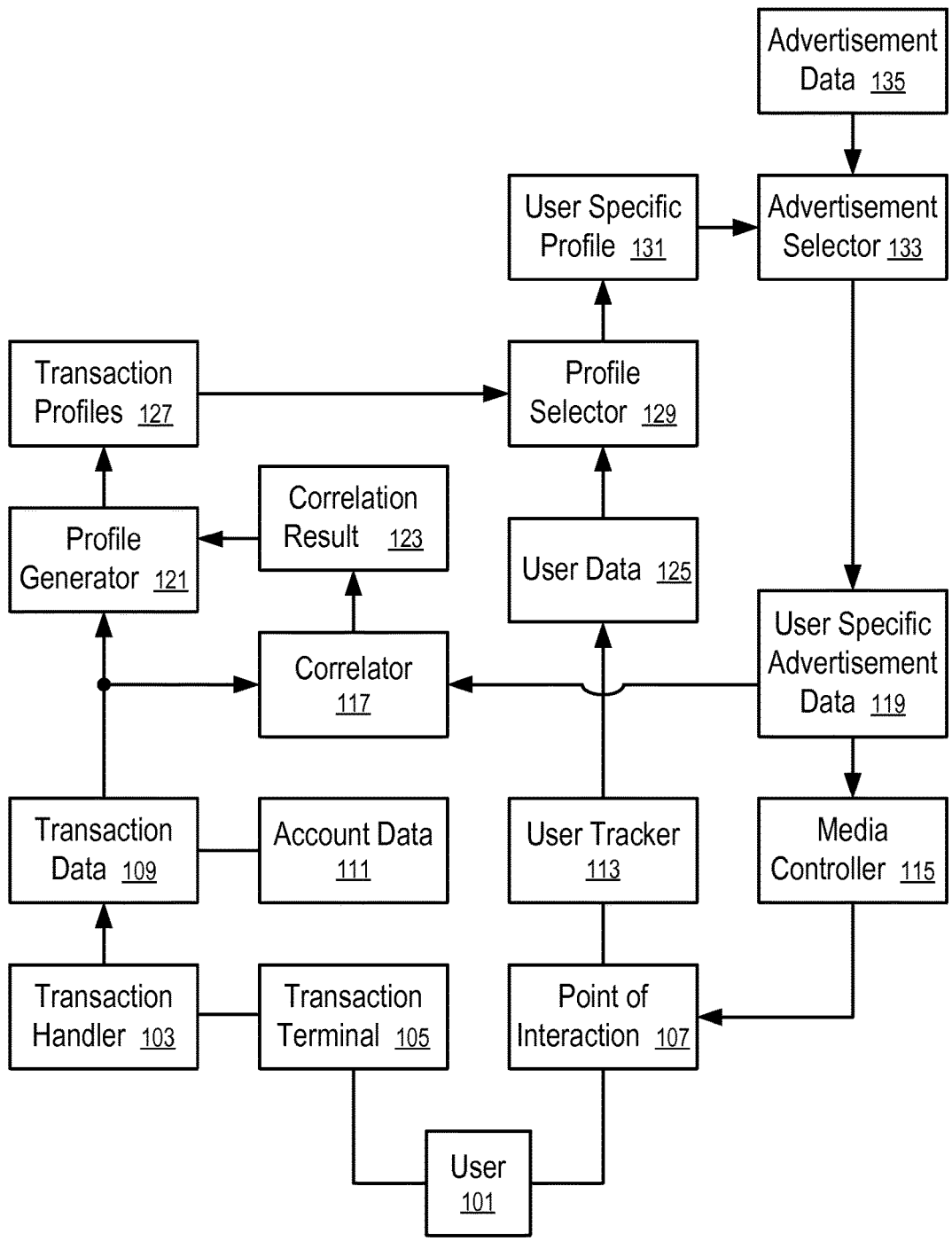
FIG. 1 illustrates a system to provide services based on transaction data according to one embodiment.

In one embodiment, a transaction handler is configured to determine whether a transaction in a payment account, as identified in an authorization request, received from an acquirer processor for the transaction, is eligible for the benefit of an offer associated with the payment account, and if so, split the transaction originally requested in the payment account into two or more transactions with an issuer processor of the payment account and one or more sponsor processors of the offer to apply the benefit of the offer to the authorization request for the transaction requested. The two or more transactions are combined for the transaction terminal of the merchant and/or the acquirer processor, such that the details of the two or more transactions are insulated from the transaction terminal and/or the acquirer processor. Thus, a conventional transaction terminal and/or a conventional acquirer processor can be used in the system configured to apply the benefit of an offer during the processing of a transaction initiated and completed at the transaction terminal. Further details and examples are provided in the section entitled "SPLIT TRANSACTION."

In one embodiment, the transaction handler is configured to host offers associated with the application of values from stored value accounts, such as prepaid card accounts or gift card accounts, towards payment transactions with merchants. In one embodiment, the stored value accounts are issued for transactions with the respective merchants but not other merchants. Further details and examples are provided in the section entitled "STORED VALUE ACCOUNTS."

To facilitate offer redemption via the split-transaction technique as identified above, data associating offers with account information identifying the consumer accounts or payment accounts of the users can be stored in a data warehouse coupled with the transaction handler. For example, in one embodiment of associating offers with consumer/payment accounts, a portal of the transaction handler is configured to store data representing offers, and to associate user selected offers with the financial accounts of the respective users, if the users select advertisements containing the offers. When the financial accounts are used to make payments processed by the transaction handler for purchases that satisfy the respective redemption conditions of the offers, the transaction handler and/or the portal are configured to detect such payment transactions and fulfill the offers in an automated way, such as in the embodiment of the split-transaction identified above.

For example, the advertisement providing the offer can be configured to have multiple selectable regions when the advertisement is presented in a web browser of a user. Examples of offers include discounts, incentives, rebates, coupons, rewards, cash back, etc. One of the selectable-regions contains a Uniform Resource Locator (URL) of the advertiser or merchant, which, when selected, directs the user to the website of the advertiser or merchant. A separate one of the selectable regions contains a Uniform Resource Locator (URL) of the portal of the transaction handler, which, when selected, directs the user to the portal for access to a user interface to register the offer with a financial account of the user. Examples of financial accounts of users include credit card accounts, debit card accounts, prepaid card accounts, bank accounts, etc. Some details and examples about associating offers with financial accounts are provided in the section entitled "OFFER REDEMPTION."

After the offer is associated with the financial account of the user, the transaction handler and/or the portal are configured to detect that the user is making a payment using the financial account for a purchase that satisfies the redemption requirements of the offer. In response to the detection, the portal may optionally notify the user of the eligibility of the redemption of the offer using a communication reference associated with the financial account, and the transaction handler and/or the portal are configured to automate the processing of the offer for redemption, such as using the split-payment embodiment identified above, or via statement credits to the financial account of the user, or via benefits afforded via a loyalty program, such as reward points, loyalty points, etc. Some details and examples about offer fulfillment operations are provided in the section entitled "OFFER REDEMPTION."

When an offer is sponsored by the merchant, the transaction handler can be configured in one embodiment to apply the benefit of the registered offer during the authorization and/or settlement of the transaction that meets the requirement for the redemption of the offer via modifying the transaction amount. For example, the authorization amount can be changed by the transaction handler to provide the benefit of the registered offer during the authorization phase of the transaction in one embodiment, and the settlement amount can be changed by the transaction handler to provide the benefit of the registered offer during the settlement phase of the transaction in another embodiment. Some details and examples about redeeming offer benefits via modifying transaction amounts are provided in the section entitled "APPLY OFFER."

Since the transaction handler records the transaction data for transactions made in various purchase channels, such as online marketplaces, offline in retail stores, phone orders, etc., the registered offer can be redeemed in an automated way, without being limited by the channel used to make the purchase and limited by the context of the purchase. Thus, the system provides a normalized, real-time, online and offline, redemption service for offers in combination with, and integrated with, the processing of payment transactions.

The transaction data, such as records of transactions made via credit accounts, debit accounts, prepaid accounts, bank accounts, stored value accounts and the like, can be further processed to optionally provide information for various services, such as reporting, benchmarking, advertising, content or offer selection, customization, personalization, prioritization, etc. In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities.

Split Transaction

Figure 27:
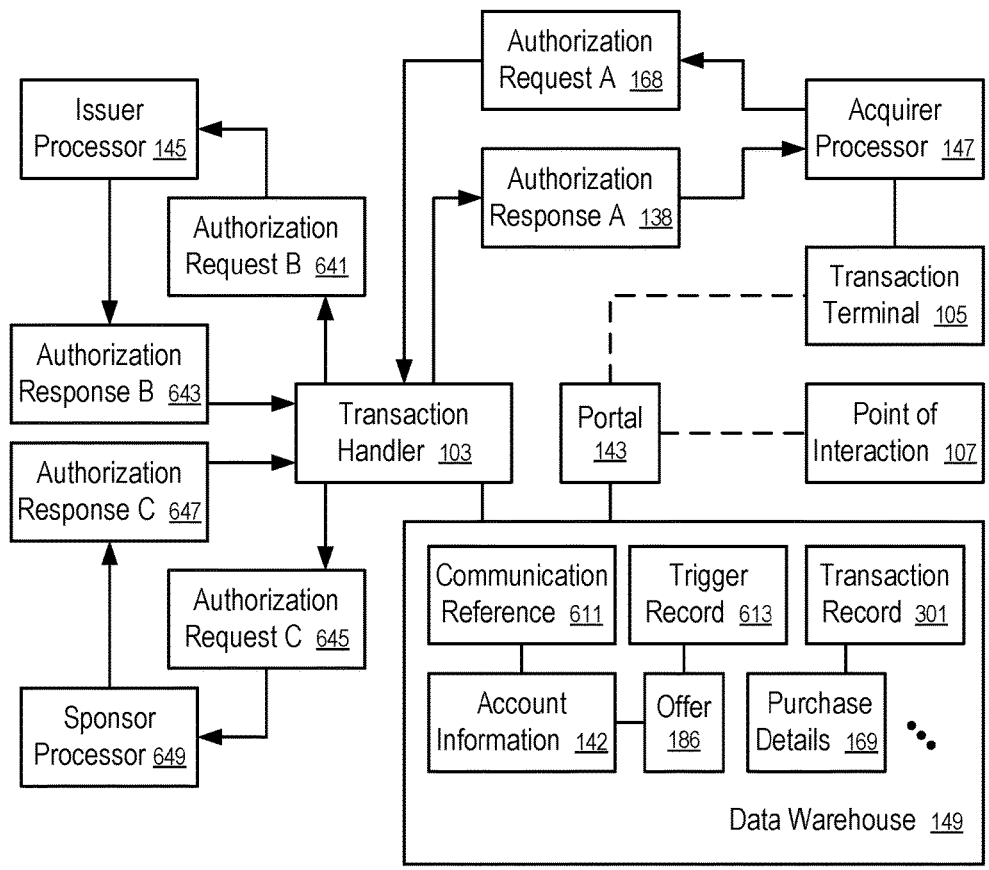
FIG. 27 shows a system to apply the benefit of an offer via a transaction handler according to one embodiment.

FIG. 27 shows a system to apply the benefit of an offer (186) via the transaction handler (103) according to one embodiment. In FIG. 27, after the transaction handler (103) (e.g., as in a payment processing system illustrated in FIG. 4) receives an authorization request (168) from an acquirer processor (147) associated with the transaction terminal (105) of a merchant, the transaction handler (103) determines whether there is an offer (e.g., 186) that is applicable to the transaction requested by the authorization request (168) in a payment account that is issued to a user and identified by account information provided in the authorization request (168). If there is an offer (e.g., 186) that has a benefit applicable to the transaction, the transaction handler (103) is configured to generate a plurality of authorization requests (e.g., 641, 645) in accordance with the original authorization request (168) received from the acquirer processor (147) and the offer (186) stored in the data warehouse (149), in association with the account information (142), as identified in the original authorization request (168). The plurality of authorization requests (e.g., 641, 645) are generated by and transmitted from the transaction handler (103) for a plurality of transactions, which, when combined, correspond to the original transaction requested by the authorization request (168) received from the acquirer processor (147). When the plurality of authorization requests (e.g., 641, 645) are approved, a message can be optionally transmitted by a portal (143), coupled with the data warehouse (149) and/or the transaction handler (103), using the communication reference (611) stored in the data warehouse (149) in association with the account information (142). The message is transmitted to a communication device of the user (101) to inform the user (101) of the benefit that is applied to the transaction requested by the transaction terminal (105). When the plurality of authorization requests (e.g., 641, 645) are approved, the transaction handler (103) provides a single authorization response (138) responsive to the original authorization request (168) to the acquirer processor (147). Thus, the details of the plurality of transactions generated from the original authorization request (168) are shielded from the acquirer processors (147) and/or the transaction terminal (105), such that a conventional acquirer processor (147) and/or a conventional transaction terminal (105) can also be used in the system for the combined processing of payment transaction and benefit redemption. Thus, the interoperability of the combined payment and offer benefit processing system is improved for existing infrastructure of acquirer processors and/or transaction terminals.

Figure 4:
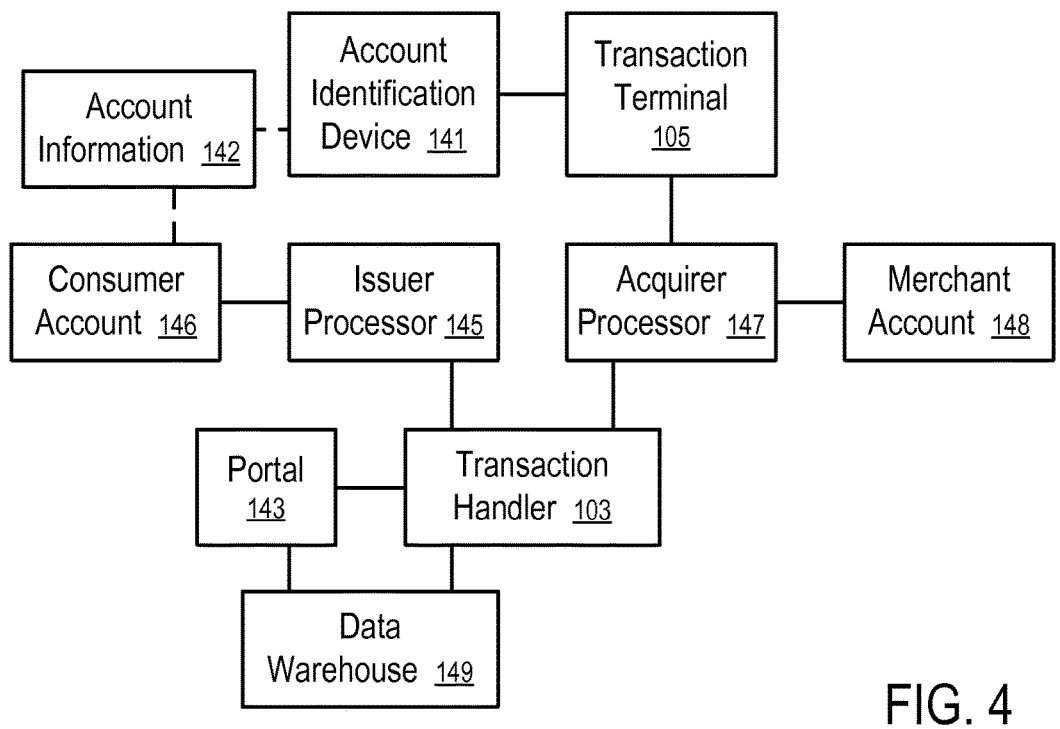
FIG. 4 shows a system to provide information based on transaction data according to one embodiment.

In FIG. 27, the offer (186) is stored in the data warehouse (149) in association with the account information (142) of the payment account (e.g., consumer account (146) illustrated FIG. 4) of the user (e.g., 101 illustrated in FIG. 1). The association of the offer (186) with the account information (142) allows the offer (186) to be applied to transactions while the transactions are being processed by the transaction handler (103). Such an arrangement allows the reduction of processing time delay between the time at which redemption requirements of the offer (186) are satisfied and the time at which the benefit of the offer (186) is provided, and/or the time the redemption of the benefit of the offer (186) is communicated to the respective user (e.g., 101).

In FIG. 27, since the transaction handler (103) processes the plurality of transactions concurrently, via the transmission of the authorization requests (e.g., 641, 645) and the reception of the authorization response (e.g., 643, 647) for the respective transactions, the processing time delay is further reduced.

Further, in FIG. 27, since the generation of the plurality of transactions and combination of the plurality of transactions are arranged between the reception of the original authorization request (168) from the acquirer processor (147) and the transmission of the respective authorization response (138) back to the acquirer processor (147), the payment transaction and the benefit redemption and application would both be approved, or rejected as a whole. Thus, the integrity of the combined transaction and benefit redemption is improved.

In FIG. 27, the centralized processing of payment transaction and offer benefit redemption allows improved computation resource allocation and improved computation efficiency, when compared with implementations that require separate systems for payment processing and offer redemption, or compared with implementations that require add-on features in the acquirer processors and/or the transaction terminals.

In FIG. 27, in one embodiment of determining whether the original authorization request (168) has an applicable offer (e.g., 186), a trigger record (613) is used. A trigger record (e.g., 613) is configured to identify a standardized set of requirements to be satisfied by the authorization request (168) to trigger an action identified in the trigger record (613). For the determination of whether the benefit of the offer (186) identified by the trigger record (613) is applicable to the authorization request (168), the trigger record (613) for the offer (186) is generated to specify a subset of redemption requirements of the offer (186), selected in accordance with the standardized set predetermined for the trigger records, and the trigger record (613) for the offer (186) further identifies an action to process the offer (186) if the requirements specified in the trigger record (613) are satisfied.

Since requirements used in the trigger records (613) are in the standardized set, the operation of the transaction handler (103) in determining whether an action requested in the trigger record (613) is triggered by the authorization request (168) can be optimized for performance improvement, while supporting a variety of diverse services corresponding to actions that can be specified in trigger records (e.g., 613), such as the processing of the benefit redemptions of different offers that may have diverse redemption requirements. The use of the standardized set of requirements for trigger records (613) can reduce and limit the performance impact on the transaction handler (103) in processing payment transactions, since not all requirements are initially examined by the transaction handler (103) and the standardization permits optimized operation efficiency.

In FIG. 27, the trigger record (613) is generated for the transaction handler (103) to monitor transactions processed by the transaction handler (103) for the detection of transactions relevant to the offer (186). The trigger record (613) includes a set of conditions to match against transactions that are processed by the transaction handler (103). When the conditions specified in the trigger record (613) are not satisfied by a transaction, the transaction is not relevant to the offer (186). When a transaction satisfies the conditions specified in the trigger record (613), the trigger record (613) further identifies a task to process the offer (186). The task includes determining whether all redemption requirements of the offer (186) have been met; and if so, providing the benefit of the offer (186) to the transaction, such as via the generation of the multiple authorization requests (e.g., 641, 645) which, when combined, correspond to the original authorization request (168). Thus, the trigger record (613) allows the transaction handler (103) to trigger actions to process the offer (186) while reducing the burden on the transaction handler (103) in processing transactions not applicable to the offer (186), thus improving the overall efficiency of the transaction handler (103) in processing transactions that may or may not be relevant to offers (e.g., 186) in general.

The system illustrated in FIG. 27 allows a conventional transaction terminal (105) and/or a conventional acquirer processor (147) to be used to initiate a conventional authorization request (168), while the redemption of the benefit of the offer (186) can still be applied to the transaction when the redemption requirements are satisfied by the transaction identified by the conventional authorization request (168).

Further, the system as illustrated in FIG. 27 allows the benefit of the offer (186) to be applied to a transaction initiated at the transaction terminal (105) before the transaction is approved at the acquirer processor (147) and the transaction terminal (105).

In FIG. 27, the transaction terminal (105) initiates the transaction via transmitting an authorization request (168) to the acquirer processor (147), which propagates the authorization request (168) to the transaction handler (103). The transaction handler (103) is configured to match the transaction against applicable trigger records (e.g., 613) to determine if a further action is to be triggered for the transaction corresponding to the authorization request (168). Although FIG. 27 illustrates the use of the trigger records (e.g., 613) to identify applicable offers (e.g., 186) for incoming authorization requests (e.g., 168), the transaction handler (103) may process the offers (186) directly in alternative implementations without the use of the trigger records (e.g., 613).

In FIG. 27, if the authorization request (168) satisfies the conditions of the trigger record (613), the transaction handler (103) is configured to process the offer (186) identified by the matching trigger record (613).

The offer (186) specifies a set of conditions, which, when satisfied, allow a benefit sponsored by the sponsor processor (649) to be applied to the respective transaction. Thus, when the authorization request (168) satisfies the trigger record (613) generated for the offer (186), the transaction handler (103) and/or the portal (143) (or a separate processor coupled with the transaction handler (103)) is configured to determine whether the entire set of the conditions of the offer (186) is satisfied for the award of the benefit to the respective transaction, in view of the authorization request (168) received from the acquirer processor (147).

If the benefit of the offer (186) is determined to be applicable to the transaction corresponding to the authorization request (168), the transaction handler (103) communicates an authorization request (645) to the sponsor processor (649) for the authorization of an amount to be applied to the transaction initiated on the transaction terminal (105), and separately communicates an authorization request (641) to the issuer processor (145) for the authorization of an amount from the consumer account (146) identified via the account information (142) submitted by the transaction terminal (105) to initiate the respective transaction.

In one embodiment of the generation of the authorization requests (e.g., 641, 645), the transaction handler (103) (or the portal (143), or a separate processor coupled with the transaction handler (103)) is configured to determine the transaction amounts for the authorization requests (645 and 641) based on the transaction amount requested in the authorization request (168) received from the acquirer processor (147) and the benefit specified in the offer (186).

In FIG. 27, the transaction amount in the authorization request (645) to the sponsor processor (649) corresponds to the benefit of the offer (186), which may be a fixed amount that is independent of the transaction amount requested in the authorization request (168) received from the acquirer processor (147), or a predetermined percentage of the transaction amount requested in the authorization request (168) received from the acquirer processor (147).

In FIG. 27, the transaction amount in the authorization request (641) to the issuer processor (145) corresponds to the difference between the transaction amount requested in the authorization request (168) received from the acquirer processor (147) and the benefit of the offer (186) that corresponds to the transaction amount in the authorization request (645) to the sponsor processor (649).

Thus, the transaction handler (103) effectively splits the transaction corresponding to the authorization request (168) received from the acquirer processor (147) into two transactions corresponding to the authorization requests (641 and 645) to the issuer processor (145) and the sponsor processor (649), respectively.

FIG. 27 illustrates an example of an offer (186) that is sponsored by a sponsor processor (649). The technique can be extended to the processing of an offer (186) that is sponsored by a plurality of sponsor processors (e.g., 649). The transaction handler (103) can be configured to split the transaction corresponding to the authorization request (168) received from the acquirer processor (147) into multiple transactions corresponding to the authorization requests to the issuer processor (145) and the sponsor processors (e.g., 649) respectively.

In FIG. 27, the transaction handler (103) is configured to identify the issuer processor (145) based on the account information (142) identified in the authorization request (168) received from the acquirer processor (147), and to identify the sponsor processor (649) based on the offer (186) that is associated with the account information (142) and identified via the trigger record (613).

In FIG. 27, after the transaction handler (103) receives the authorization responses (647 and 643) from the sponsor processor (649) and the issuer processor (145), respectively, for the authorization requests (645 and 641), the transaction handler (103) is configured to combine the authorization responses (647 and 643) received from the sponsor processor (649) and the issuer processor (145), respectively, to generate an authorization response (138) to the acquirer processor (147), which further propagates the authorization response (138) to the acquirer processor (147) and the transaction terminal (105).

Since the authorization responses (647 and 643) are combined by the transaction handler (103) to generate a single authorization response (138) for the acquirer processor (147), the implementation details of the application of the offer (186) are separate from the transaction terminal (105), and thus a conventional transaction terminal (105) can be used to apply the benefit of the offer (186) to the eligible transaction, without a need for modification in hardware and/or software. The transaction terminal (105) submits the transaction authorization request (168) and receives the authorization response (138), as if the transaction were processed using the consumer account (146), as identified by the account information (142), and as if the transaction were processed without the involvement of the offer (186) and/or the sponsor processor (649).

The transaction terminal (105) of one embodiment has no information about the application of the benefit of the offer (186) to the transaction initiated and approved on the transaction terminal (105). The transaction terminal (105) thus produces a receipt, which may be interpreted to indicate that the entire transaction amount is funded by the consumer account (146) identified by the account information (142). To inform the user (101) of the applicable benefit of the offer (186), the portal (143) is configured to generate and send a message to the point of interaction (107) (e.g., a mobile phone, a mobile computer, a personal media player, a personal digital assistant, a tablet computer, a digital wallet, a social networking site, an email inbox, etc.) identified by the communication reference (611) associated with the account information (142) of the user (101).

For example, a text message is transmitted in accordance with the communication reference (611) to a mobile phone of the user (101) to inform the user (101) of the application of the benefit of the offer (186) to the transaction initiated and approved on the transaction terminal (105). Alternatively or in combination, the notification about the awarded/redeemed benefit of the offer (186) can be transmitted via an email message, a web-based message, a voice message, etc.

The portal (143) of one embodiment is configured to transmit the notification message about the award/redemption of the benefit of the offer (186) in response to the authorization responses (643 and 647) from the issuer processor (145) and the sponsor processor (649), prior to or in parallel with the transmission of the authorization response (138) to the acquirer processor (147). Thus, the transmission of the notification is substantially concurrent with the propagation of the authorization of the transaction to the transaction terminal (105). As a result, the delay to the user reception of the notification is reduced.

The transaction handler (103) is configured in one embodiment to further settle the transactions corresponding to the authorization responses (643 and 647) from the issuer processor (145) and the sponsor processor (649) to effectively complete the transaction corresponding to the authorization response (138) to the acquirer processor (147).

FIG. 27 illustrates the use of a sponsor processor (649) to apply the benefit of the offer (186). In general, a plurality of sponsor processors (e.g., 649) can be used when the offer (186) is sponsored by a plurality of entities. In some examples of the offers (186), the sponsor processor (649) may be the same as the issuer processor (145) (e.g., when the benefit is sponsored by the issuer). In some examples, the sponsor processor (649) is connected to a computing system of the merchant (e.g., when the benefit is sponsored by the merchant).

FIG. 27 illustrates an embodiment in which the transaction handler (103), interconnecting acquirer processors (e.g., 147) and issuer processors (e.g., 145) in a payment communications network, is configured to split the authorization requests in view of applicable offers and combine corresponding authorization responses generated from splitting operations; the technique can be extended to implementing such operations on other components on a payment communications network, such as a payment processor interconnecting transaction terminals and acquirer processors and/or transaction handlers of different payment communications networks, an acquirer processor interconnecting transaction terminals and transaction handlers of different payment communications networks, etc.

Figure 28:
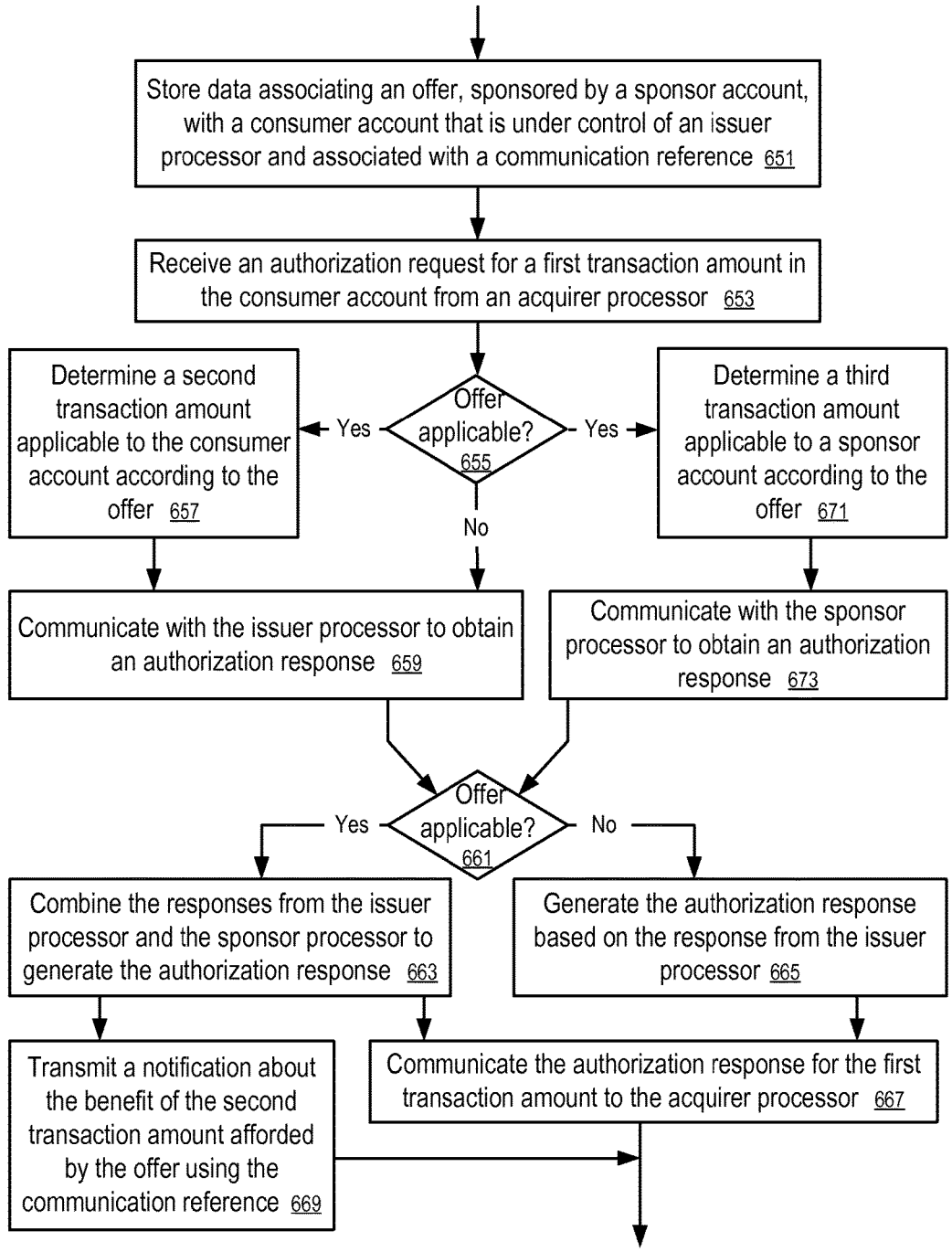
FIG. 28 shows a method to process a transaction according to one embodiment.

FIG. 28 shows a method to process a transaction according to one embodiment. For example, the method as shown in FIG. 28 can be implemented in the system shown in FIG. 27, or modified systems as discussed above.

In FIG. 28, a computing device is configured to store (651) data associating an offer (186), sponsored by a sponsor account administrated by a sponsor processor (649), with a consumer account (146) that is under control of an issuer processor (145) and associated with a communication reference (611). The offer (186) may be sponsored by more than one sponsor account administrated by more than one sponsor processor connected in a payment communications network interconnected by a transaction handler (e.g., 103).

In FIG. 28, after the computing device receives (653) an authorization request (168) for a first transaction amount in the consumer account (146) from an acquirer processor (147), the computing device determines (655) whether the offer (186) is applicable to the first transaction amount, and if not, communicates (659) with the issuer processor (145) to obtain an authorization response (643) for the first transaction amount without contacting the sponsor processor (649).

If the offer (186) is applicable (655) to the first transaction amount, the computing device is configured to determine (657) a second transaction amount applicable to the consumer account (146) according to the offer (186) and the first transaction amount, and determine (671) a third transaction amount applicable to a sponsor account according to the offer (186). The computing device communicates (673) with the sponsor processor (649) to obtain an authorization response (647) for the third transaction amount, and communicates (659) with the issuer processor (145) to obtain an authorization response (643) for the second transaction amount.

If the computing device determines (661) that the offer (186) is applicable to the authorization request (168) received from the acquirer processor (147), the computing device is configured to combine (663) the responses (643 and 647) from the issuer processor (145) and the sponsor processor (649) to generate the authorization response (138) to the acquirer processor (147), and transmit (669) a notification about the benefit of the second transaction amount afforded by the offer (186), using the communication reference (611).

If the computing device determines (661) that the offer (186) is not applicable to the authorization request (168) received from the acquirer processor (147), the computing device is configured to generate (665) the authorization response (138) based on the authorization response (643) from the issuer processor (145).

The computing device communicates (667) the authorization response (138) for the first transaction amount to the acquirer processor (147), as a response to the authorization request (168) received from the acquirer processor (147).

Since the transaction terminal (105) is arranged to process the transactions that may or may not involve the redemption of the benefit of the offers (e.g., 186) in a conventional way, the system can be used with conventional transaction terminals (e.g., 105) without modification.

Preferably, the authorization requests (e.g., 168, 641, 645) and the authorization responses (e.g., 138, 643, 647) are in accordance with existing standards, and thus the system can be used with existing acquirer processors (e.g., 147) and issuer processors (e.g., 145) without modifications.

The computing device of one embodiment includes at least one of: the data warehouse (149), the transaction handler (103), and the portal (143). For example, the warehouse (149) is configured to store data associating the offer (186), the account information (142), and the communication reference (611), as illustrated in FIG. 27; the transaction handler (103) is configured to detect the authorization request (168) that has a corresponding applicable offer (186), to split the authorization request (168) to generate multiple authorization requests (641, 645), and combine respective authorization responses (643, 647); and the portal (143) is configured to transmit a notification of the application of the benefit of the offer (186) to a point of interaction (107) identified by the communication reference (611) after the respective authorization responses (643, 647) are received.

Figure 7:
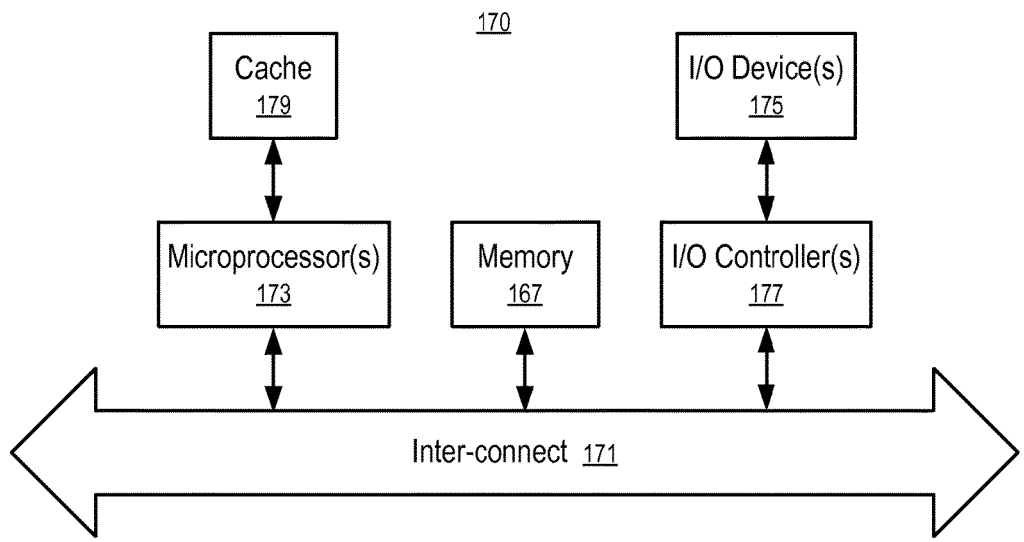
FIG. 7 illustrates a data processing system according to one embodiment.

The computing device can be implemented using one or more data processing systems as illustrated in FIG. 7, having at least one microprocessor (173) and memory (167) storing instructions configured to instruct the at least one microprocessor (173) to perform operations discussed above.

In one embodiment, the computing apparatus is configured, at least in part via instructions, to: receive an authorization request (e.g., 168) identifying a transaction of a first amount in an account (e.g., 146) of a user (e.g., 101); and determine, based on data (e.g., 186 and 142) stored to associate an offer with the account, whether a benefit of the offer (e.g., 186) is applicable to the transaction. In response to a determination that the benefit of the offer is applicable to the transaction, the computing apparatus is further configured to: communicate with a sponsor processor (e.g., 649) of the benefit for authorization of the benefit of a second amount; communicate with an issuer processor (e.g., 145) of the account for authorization to a third amount determined from a difference between the first amount and the second amount; and generate a third authorization response (e.g., 138) for the authorization request based on a first authorization response (e.g., 647) for the second amount from the sponsor processor (e.g., 649) and a second authorization response (e.g., 643) for the third amount from the issuer processor (e.g., 145).

The authorization request (e.g., 168) may be received from an acquirer processor (e.g., 147) and the authorization response (e.g., 138) transmitted to the acquirer processor (e.g., 147) as a response to the authorization request (e.g., 168), where the authorization request (e.g., 168) identifies the account (e.g., 146) as a single source of payment for the transaction.

If the authorization request (168) is referred to as a third authorization request, in communicating with the sponsor processor (649) the computing apparatus is configured in one embodiment to transmit to the sponsor processor (649) a first authorization request (645) identifying the benefit and receive the first authorization response (647); and in communicating with the issuer processor (145) the computing apparatus is configured to transmit to the issuer processor (145) a second authorization request (641) identifying a second transaction amount in the account and receive the second authorization response (643).

If the third authorization request (168) identifies a third transaction amount in the account, the computing apparatus is configured in one embodiment to determine the second transaction amount by reducing the third transaction amount according to the benefit of the offer.

In one embodiment, the third authorization response (138) is generated to approve the transaction, if the first authorization response (647) approves the benefit and the second authorization response (643) approves the second transaction amount in the account; and the third authorization response (138) is generated to reject the transaction, if the first authorization response (647) rejects the benefit or the second authorization response (643) rejects the second transaction amount in the account.

When the benefit of the offer (186) of one embodiment is controlled by multiple sponsor processors, in response to the determination that the benefit of the offer is applicable to the transaction, the computing apparatus is configured to communicate with a further sponsor processor for authorization of a further benefit of the offer, in addition to communication with the sponsor processor (649); and the third authorization response (138) is generated based on a further authorization response from the further sponsor processor, the first authorization response (647), and the second authorization response (643).

The computing apparatus may optionally store a trigger record (613) identifying a first set of requirements and the offer for enhanced performance. When the trigger record (613) is used, the determining of whether the benefit of the offer is applicable to the transaction may include: determining whether the transaction satisfies the first set of requirements specified in the trigger record (613), and in response to a determination that the transaction satisfies the first set of requirements, identifying the offer based on the trigger record and determining whether a second set of requirements of the offer (186) are satisfied to qualify the transaction for the benefit.

The computing apparatus is configured in one embodiment to communicate with the sponsor processor and the issuer processor concurrently.

The computing apparatus can further store data (e.g., 611, 142) associating a communication reference with the account of the user, and transmit a notification about application of the benefit to the transaction concurrently with transmitting the third authorization response (138).

In one embodiment, a transaction amount approved in the third authorization response (138) is equal to the sum of a transaction amount approved in the first authorization response (647) and a transaction amount approved in the second authorization response (643).

For example, the computing apparatus includes a transaction handler (103) in a payment communications network interconnected by the transaction handler; and the computing apparatus uses the transaction handler (103) to communicate with the sponsor processor (649) and the issuer processor (145) using on the payment communications network.

In one embodiment, the computing apparatus includes a portal (143) to transmit a notification of a reduction in transaction amount in the account, reduced in accordance with the offer (186), to the user at a communication reference (611) associated with the account information (142) of the user (101). When the authorization request (168) is received from an acquirer processor (147), the notification can be transmitted in parallel with transmission of the third authorization response (138) to the acquirer processor (147).

In one embodiment, to determine whether the benefit of the offer (186) is applicable to the transaction, the computing apparatus is configured to: store a trigger record (613) identifying the offer (186) and a portion of requirements of the offer (186) to be satisfied by the transaction to qualify for a benefit of the offer; identifying the transaction based on matching the transaction with the portion of requirements; and after the transaction and the offer are identified via matching the trigger record with transactions, determining whether the transaction satisfies the requirements for awarding the benefit of the offer (186).

The computing apparatus has at least one processor and memory storing instructions configured to instruct the at least one processor to perform operations. For example, the computing apparatus of one embodiment includes a data warehouse (149) configured to store first data associating a communication reference (611) with an account (146) of a user and second data associating an offer (186) with the account (146) identified by the account information (142). The second data may include a trigger record (613) identifying the offer (186) and a first set of conditions that requires a transaction in the account to be satisfied. The offer (186) has a benefit applicable to a transaction satisfying a second set of conditions that includes the first set. The computing apparatus further includes a transaction handler (103) configured to process payment transactions to detect an authorization request (168) for a first transaction when the first transaction satisfies the first set of conditions specified in the trigger record (613). After the authorization request is detected, the computing apparatus identifies the offer (186) based on the trigger record (613) matching the first transaction and determines whether the second set of conditions is satisfied in view of the first transaction. If the second set of conditions is satisfied, the transaction handler is configured to communicate with a sponsor processor (649) of the benefit for authorization of the benefit, communicate with an issuer processor (145) of the account for authorization in the account, and generate a third authorization response (138) for the authorization request (168) based on a first authorization response (647) from the sponsor processor (649) and a second authorization response (643) from the issuer processor (145). The computing apparatus further includes a portal (143) configured to transmit a notification to the communication reference (611) about application of the offer to the first transaction, concurrently with transmission of the third authorization response (138).

In one embodiment, the notification is transmitted to the communication reference when the third authorization response (138) approves the first transaction; and the transaction handler (103) is configured to concurrently transmit the first authorization request (645) and the second authorization request (641).

The computing device can be further implemented, optionally, to perform other operations discussed below, such as the operations discussed in the section entitled "TRANSACTION DATA BASED SERVICES." Some of the hardware arrangements are discussed in the sections entitled "CENTRALIZED DATA WAREHOUSE" and "HARDWARE."

For example, the transaction handler (103) discussed above can be used to record transaction data (109) to provide transaction data based services as illustrated in FIG. 1 and discussed in the section entitled "TRANSACTION DATA BASED SERVICES".

Stored Value Accounts

In one embodiment, an issuer processor operates a network of closed loop gift cards programs, including gift cards from merchants such as Macy's, Applebee's and others. The issuer processor provides a digital wallet via a website and/or a mobile application. The digital wallet allows a consumer to enter in various gift cards from different merchants so consumers don't have to carry around the cards. The issuer processor and/or the digital wallet are configured to look up the balances of the gift cards added to the digital wallet.

In one embodiment, the closed loop network of the issuer processor is tapped into and combined with the offers and redemption capabilities disclosed in various sections of the present disclosure to provide consumers with more options in redeeming their gift cards, make it easier to ensure they always have the cards available for redemption and use every last penny and increase transaction volume presumably.

In one embodiment, the issuer processor is relied upon for the redemption capability; and the data warehouse of the transaction handler (103) does not have to maintain the card balances of the prepaid cards, gift cards, etc., associated with the issuer processor. In one embodiment, there are no primary "linked" consumer accounts for redemption. The portal of the transaction handler (103) is configured to use the information about the transactions and customer segmentation information derived from the transactions in the enrolled cards to provide timely offers in conjunction with outstanding gift cards. In one embodiment, the offers may be configured to encourage the use of the consumer accounts of the respective users via minimum spend thresholds configured to encourage consumers to spend more than the balance on the gift cards. The user (101) may add the consumer account (146) to the digital wallet provided by the issuer processor operating the gift card network, to receive offers, which may include additional benefits, such as merchant discounts, loyalty rewards, cashback, etc.

In one embodiment, when an enrolled user adds a new gift card to their digital wallet, the issuer processor is configured to communicate with the portal (143) of the transaction handler (103) to activate a merchant's event for the respective user, such that the portal (143) is aware of the interest of the user in the merchant. Based on the merchant event, offers are provided to the user while the user is on the go. The offers can be provided into the issuer processor digital wallet or via another communication channel. The offers can be further based upon the segmentation of users in accordance with spending behaviors reflected in the transaction data of the consumer accounts added to the digital wallets of the respective users. In one embodiment, the offers encourage the user to visit merchants to use their gift card remaining balances and receive special deals when they use their other enrolled consumer account (146). In one embodiment, the redemption of the offer can either be through discounts at the transaction terminal discussed in various sections of the present disclosure, or through the use of promotional codes for redemption at the point of sale. After the user transacts with the merchant using the gift card or prepaid card (e.g., via swiping the gift card or using the gift card through the digital wallet), the promotional code offers can be taken advantage. The balance of the purchase is paid via a second transaction in the consumer account (146), which may be separately presented via a separate account identification device, or the digital wallet. Automated offer redemption techniques can be used when the consumer account (146) linked to the offer is used to pay for the balance of the purchase.

In one embodiment, a private label account issued by the issuer processor of the digital wallet is configured as a primary linked account for the cards in the digital wallet. In one embodiment, the private label account does not carry a balance or have funds of its own. It is configured as a universal gift/prepaid card for accessing the balances of other cards/accounts in the wallet. The user can add, or link, a consumer account (146) to the digital wallet. If the user uses the private label card or the digital wallet at the transaction terminal, the issuer processor corresponding to the consumer account (146) is requested to provide a partial authorization for the difference between the balance on the applicable gift card and the purchase.

For example, when an enrolled user adds a new gift card to their digital wallet, the issuer processor corresponding to the digital wallet communicates with the portal of the transaction handler (103) to activate a merchant's event for that user, to inform the portal of the user's interested in that merchant. Based on the merchant's event, offers are provided to the user into the issuer processor digital wallet or via another communication channel. The offers may be further based on the segmentation of users based on the transaction data of the users. In one embodiment, the offers encourage the user to visit merchants to use their gift card remaining balances and receive special deals when they use the private label account. If the user uses the private label account (e.g., via the digital wallet or a separate account identification device) at the transaction terminal, the issuer processor corresponding to the digital wallet look up the linked gift card balances for that user at that merchant using the private label account and merchant identification in the authorization request. Promotional code based offers can be processed via POS discounts. The transaction handler (103) communicates with the issuer processor of the consumer account (146) for the authorization of an amount equaling the total ticket less the balance available on the applicable gift card, if the total ticket amount for the purchase is more than the balance available on the applicable gift card.

For example, in one embodiment, an offer provides a $10 discount if the user spends $100 or more when the user has a $50 balance on a gift card at the merchant. When the private label account is used to initiate the transaction, the transaction handler (103) or the transaction terminal reduces the transaction to $90. The issuer processor of the private label account looks up the $50 balance and returns partial authorization approval based on the gift card at the merchant. The transaction terminal requests for a payment for the remaining balance of the purchase. The user may use the consumer account (146) to pay for the remaining balance of the purchase.

In one embodiment, the transaction handler (103) is configured to provide the redemption capability; and the data warehouse of the transaction handler (103) is configured to store the balances of the individual cards associated with the issuer processor. Any accounts to be processed by the transaction handler (103) during the authorization of transactions in the respective accounts (e.g., credit, debit or prepaid card) can be used as a linked card. This arrangement allows users to use their normal top of wallet card as they do at most retailers, ensures optimal data access for optimal segmentation, provides most relevant offer delivery, and encourages the most use of the digital wallet. In one embodiment, after the user links the consumer account with one or more gift/prepaid cards, the issuer processor of the gift/prepaid cards is configured to make the normal gift card inoperable, as if it had a balance of $0 if the user swiped it via the normal gift card process (e.g., without involving the transaction handler (103)). In one embodiment, the use of the gift/prepaid cards are processed via the transaction handler (103) to be the single master of the balance after its added to digital wallet. Alternatively, the issuer processor and the transaction handler (103) are configured to communicate with each other to maintain accurate balance information, while allowing the user to use the gift/prepaid cards in ways without involving the transaction handler (103), and through the linked consumer accounts (e.g., 146).

In one embodiment, the data warehouse of the transaction handler (103) is configured to receive balances of the gift/prepaid cards at respective merchants from the issuer processor, when respective cards are added to the digital wallets provided by the issuer processor. The data warehouse of the transaction handler (103) is configured as a single master of the card balances. The data warehouse also maintains the cross references between the gift/prepaid card balances and the consumer account (146) of the user (101).

In one embodiment, when an enrolled user adds a new gift/prepaid card to the digital wallet of the issuer processor, the issuer processor is configured to send that the gift/prepaid card balance and merchant information to the portal of the transaction handler (103). In one embodiment, the gift/prepaid card is limited to be used at one or more predetermined merchants; and the merchant information identifies the set of one or more predetermined merchants associated with the gift/prepaid card.

In one embodiment, after the balance is provided to the transaction handler (103), the issuer processor is configured to remove the balance from the gift card that was added to digital wallet, to prevent the user to use the gift/prepaid card without going through the transaction handler (103). Thus, if the gift/prepaid card is used in a setting that does not involve the transaction handler (103), the issuer processor is configured to indicate that the balance the gift/prepaid card is 0.

In one embodiment, targeted offers are provided to the user (101) via the digital wallet facilitated by the issuer processor, or via another communication channel. Various methods to target, personalize, customize offers based on transaction data and/or other data, as discussed in various sections of the present disclosure can be used, based at least in part on the transaction data in the consumer account (146) and/or other accounts previously added in the digital wallet. In one embodiment, the offers encourage the user to visit merchants to use their gift/prepaid card remaining balances and receive special deals when they use their linked consumer account (e.g., 146).

In one embodiment, the user can directly use the consumer account (146) to initiate the transaction at the transaction terminal, to use the gift/prepaid card remaining balances and redeem the benefit of the offer (e.g., merchant discount, loyalty points, reward, cashback). In response to the authorization request for the transaction initiated using the consumer account (146), the transaction handler (103) is configured to look up the linked gift card balances for the user at the merchant, using the account information of the consumer account (146) and merchant identification provided in the authorization request, in a way similar to the redemption of a generic offer discussed in previous sections. The transaction handler (103) is configured to reduce from the applicable balance of gift/prepaid cards, and adjust the transaction amount before propagate the authorization request to the issuer processor associated with the consumer account (146).

In one embodiment, the transaction handler (103) is configured to retain/maintain the linked visa card/merchant gift card balance amount; and the issuer processor of the gift/prepaid cards is configured to inform the transaction handler (103) of any update those gift/prepaid cards when used by users independently from the linked consumer account.

In one embodiment, after applying the benefit of the offer and the applicable balance from the linked gift/prepaid cards, the transaction handler (103) is configured to send the issuer processor of the consumer account (146) for the authorization of an amount equaling the total ticket less the balance available on the card, less any additional discounts provided by the offer, if the amount is more than zero.

For example, the offer may provide the benefit of $10 discount. If the user spends $100 at a merchant and the user has a $50 balance on an enrolled gift card at the merchant, the transaction handler (103) is configured to apply the $10 discount to the transaction, apply the $50 balance from the enrolled gift card to the transaction and thus reduce the transaction amount to $40. The transaction handler (103) is configured to transmit the authorization request for $40 to the issuer processor of the consumer account (146), which is used to initiate the payment transaction at the transaction terminal.

In one embodiment, the issuer processor of the gift/prepaid cards and the issuer processor of the consumer account (146) are the same issuer processor. In one embodiment, the issuer processor of the gift/prepaid cards and the issuer processor of the consumer account (146) are the different issuer processors.

In one embodiment, the digital wallet is facilitated by the mobile application or website of the issuer processor of the gift/prepaid cards. In one embodiment, the digital wallet is facilitated by the mobile application or website connected to the transaction handler, the issuer processor of the consumer account (146), or a third party.

Figure 29:
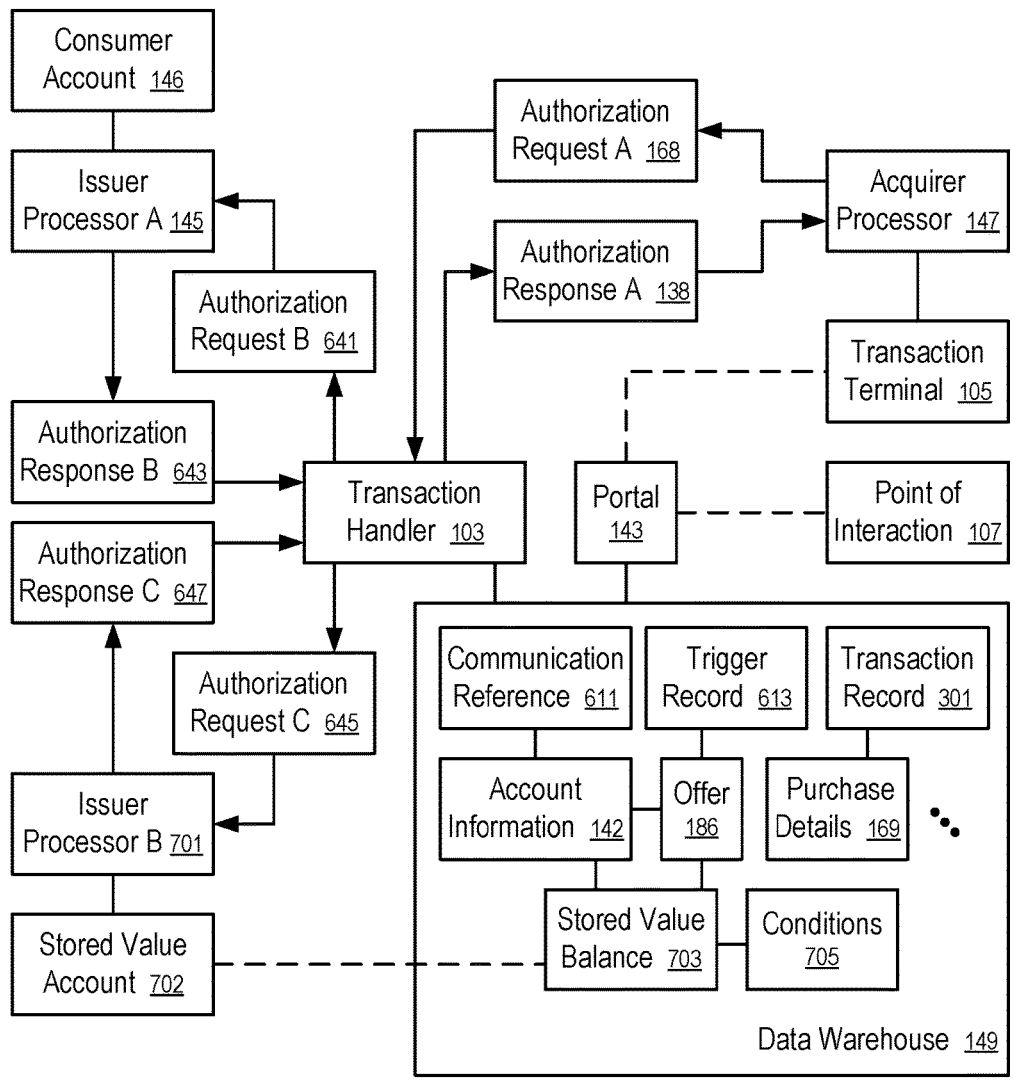
FIG. 29 shows a system to process a transaction according to one embodiment.

FIG. 29 shows a system to process a transaction according to one embodiment. In FIG. 29, the data warehouse (149) of the transaction handler (103) is configured to store data identifying the stored value balance (703) of the stored value account (702) associated with the issuer processor B (701).

The data warehouse (149) further stores the conditions (705) related to the use of the stored value accounts (702), such as a gift card for a specific merchant, a prepaid card usable at a predetermined set of merchants, etc.

In one embodiment, the stored value balance (703) is associated with the account information (142) of the consumer account (146) of the user (101) (e.g., when the user (101) adds the stored value account (702) to a digital wallet containing the consumer account (146), or via a portal (143)).

In one embodiment, a targeted offer (186) is provided to the user (101) and stored in the data warehouse (149) in associate with the account information (142). In one embodiment, the targeted offer (186) is communicated to the point of interaction (107) for presentation to the user (101). The point of interaction (107) may be a digital wallet, a mobile application, a web browser, an email client, etc.

In one embodiment, the targeted offer (186) is configured to allow the user (101) to use the stored value balance (703) in accordance with the conditions (705) in transactions with predetermined merchants. The offer (186) may provide further benefits funded by the merchant, the issuer processor (701) of the stored value account (702), the issuer processor (145) of the consumer account (146), the transaction handler (103), or a third party sponsor processor (649).

In one embodiment, the issuer processor (701) of the stored value account (702) and the issuer processor (145) of the consumer account (146) are physically separate issuer processors.

In one embodiment, the issuer processor (701) of the stored value account (702) and the issuer processor (145) of the consumer account (146) are the same issuer processor, while the consumer account (146) and the stored value account (702) are separate, different accounts.

In one embodiment, the stored value account (172) can be used at the transaction terminal (105) without going through the transaction handler (103); and the transactions made using the consumer account (146) associated with the issuer processor (145) go through the transaction handler (103) during authorization, settlement and/or clearing.

In FIG. 29, when a transaction request (168) is initiated via the use of the account information (142) at the transaction terminal (105), the transaction handler (103) is configured to identify the applicable offer (186). When the conditions (705) are satisfied, the transaction handler (103) is configured to apply the stored value balance (703) to reduce the transaction amount requested in the authorization request A (168), apply the additional benefit of the offer (186), and generate the authorization request B (641) for the remaining balance for the transaction in the consumer account (146).

In one embodiment, if the authorization response (643) approves the transaction, the transaction handler (103) places a hold on the stored value balance (703), for the subsequent settlement of the transaction.

In one embodiment, the transaction handler (103) is configured to generate the separate authorization request C (645) to obtain approval of the use of the stored value balance (703) in the transaction requested by the authorization request (168); and in such an embodiment, the data warehouse (149) does not have to store the stored value balance (703) and/or the conditions (705). In one embodiment, the data warehouse (149) stores information about the stored value account (702) to generate and route the authorization request C (645).

In one embodiment, a computing apparatus/system configured to perform the methods of the disclosure includes at least one processor and a memory stored instructions configured to instruct the at least one processor to perform the methods. The computing apparatus/system may be implemented via one or more computers connected via a network. In one embodiment, the computing apparatus includes at least one of: the data warehouse (149), the portal (143), the transaction handler (103), the issuer processor (145) of the consumer account (146), the issuer processor (701) of the stored value account (720), and the transaction terminal (105).

Details about the system in one embodiment are provided in the sections entitled "SYSTEM," "CENTRALIZED DATA WAREHOUSE" and "HARDWARE."

Transaction Data Based Services

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 1, the system further includes a correlator (117) to correlate user specific advertisement data (119) with transactions resulting from the user specific advertisement data (119). The correlation results (123) can be used by the profile generator (121) to improve the transaction profiles (127).

Figure 2:
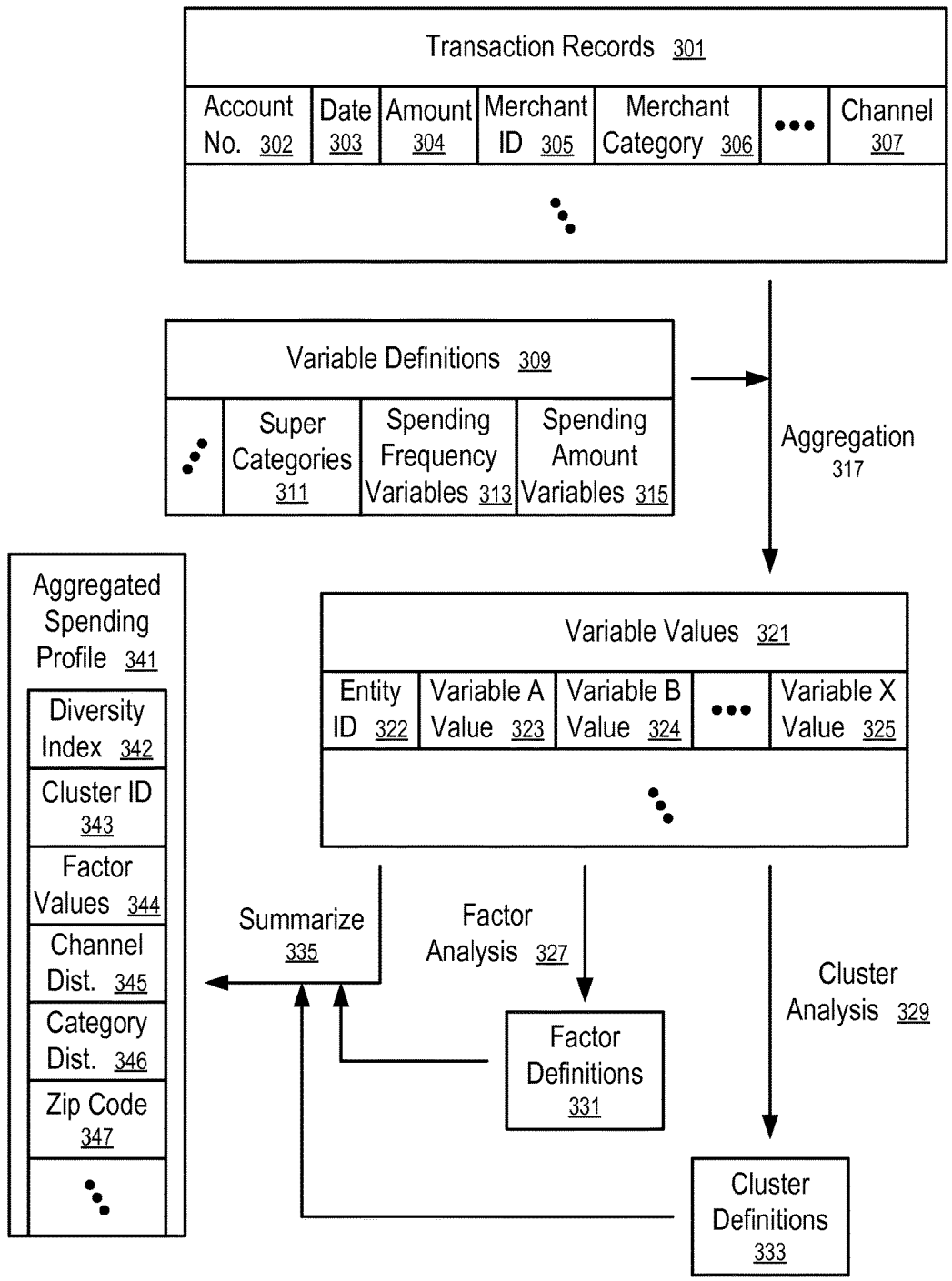
FIG. 2 illustrates the generation of an aggregated spending profile according to one embodiment.
Figure 3:
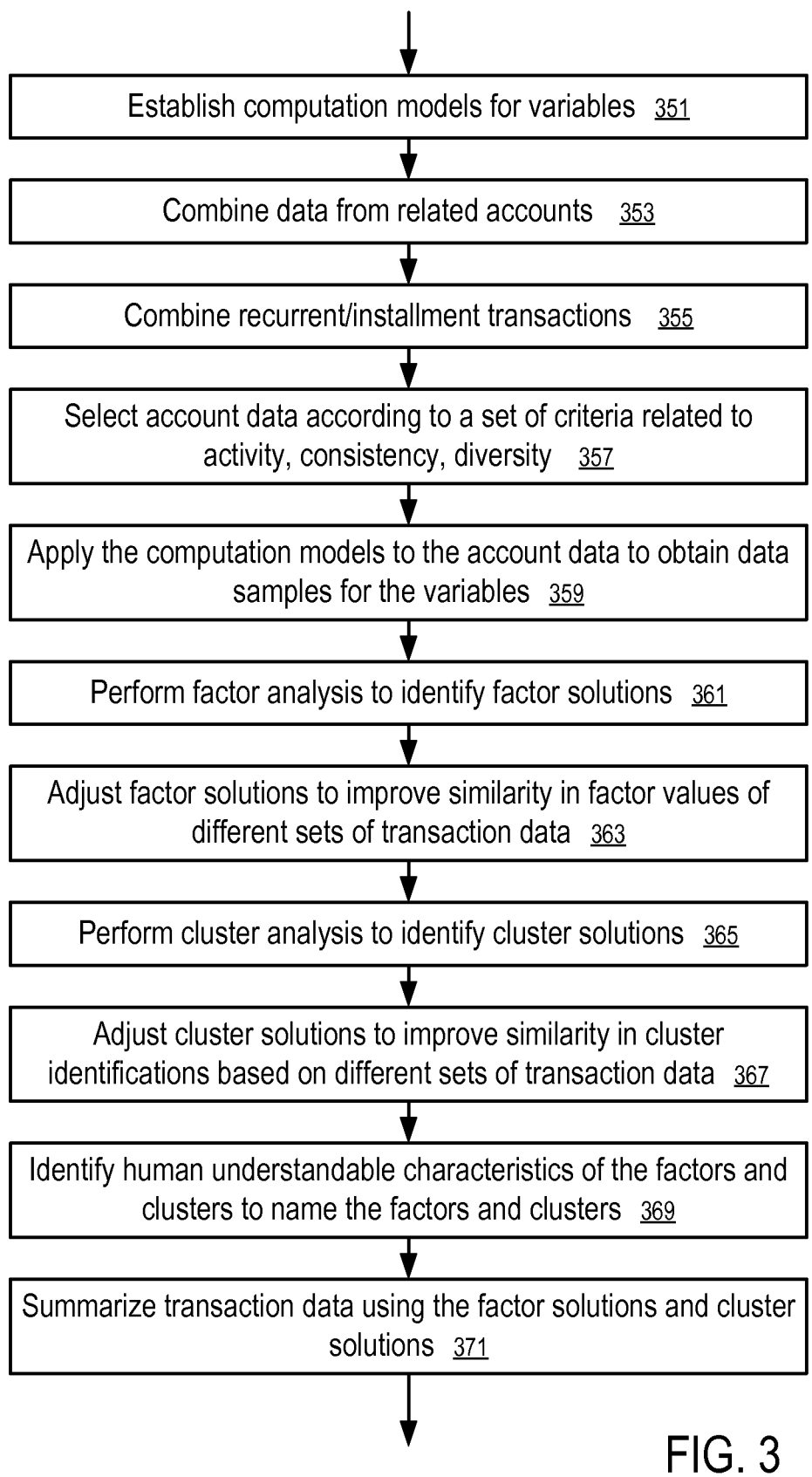
FIG. 3 shows a method to generate an aggregated spending profile according to one embodiment.

The transaction profiles (127) of one embodiment are generated from the transaction data (109) in a way as illustrated in FIGS. 2 and 3. For example, in FIG. 2, an aggregated spending profile (341) is generated via the factor analysis (327) and cluster analysis (329) to summarize (335) the spending patterns/behaviors reflected in the transaction records (301).

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
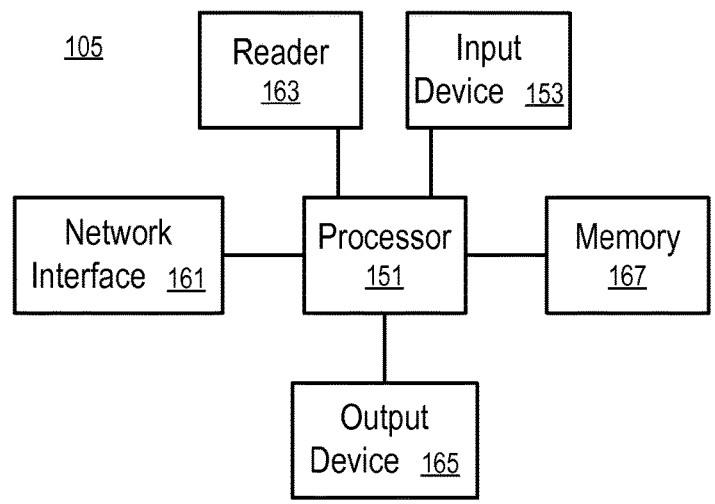
FIG. 5 illustrates a transaction terminal according to one embodiment.
Figure 6:
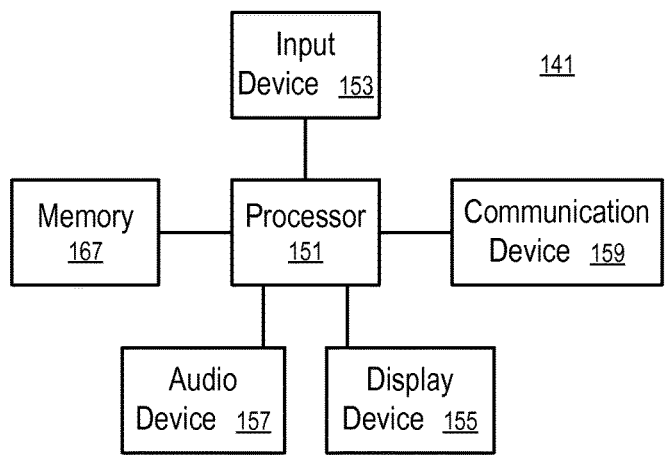
FIG. 6 illustrates an account identifying device according to one embodiment.

FIGS. 5 and 6 illustrate examples of transaction terminals (105) and account identification devices (141). FIG. 7 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 1, 4-7, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010, assigned U.S. Pat. App. Pub. No. 2010/0280882, and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned U.S. Pat. App. Pub. No. 2008/0319843, and entitled "Supply of Requested Offer Based on Point-of Service to Offeree Distance," U.S. patent application Ser. No. 11/755,575, filed May 30, 2007, assigned U.S. Pat. App. Pub. No. 2008/0300973, and entitled "Supply of Requested Offer Based on Offeree Transaction History," U.S. patent application Ser. No. 11/855,042, filed Sep. 13, 2007, assigned U.S. Pat. App. Pub. No. 2009/0076896, and entitled "Merchant Supplied Offer to a Consumer within a Predetermined Distance," U.S. patent application Ser. No. 11/855,069, filed Sep. 13, 2007, assigned U.S. Pat. App. Pub. No. 2009/0076925, and entitled "Offeree Requested Offer Based on Point-of Service to Offeree Distance," and U.S. patent application Ser. No. 12/428,302, filed Apr. 22, 2009, assigned U.S. Pat. App. Pub. No. 2010/0274627, and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned U.S. Pat. App. Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007, assigned U.S. Pat. App. Pub. No. 2008/0082418, and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No.

12/185,332, filed Aug. 4, 2008, assigned U.S. Pat. App. Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010, assigned U.S. Pat. App. Pub. No. 2011/0035280, and entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

In one embodiment, the portal (143) is configured to identify the consumer account (146) based on the IP address identified in the user data (125) through mapping the IP address to a street address.

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010, assigned U.S. Pat. App. Pub. No. 2011/0093327, and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

The correlator (117) is configured in one embodiment to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010, assigned U.S. Pat. App. Pub. No. 2011/0035278, and entitled "Systems and Methods for Closing the Loop between Online Activities and Offline Purchases," the disclosure of which application is incorporated herein by reference.

Loyalty Program

In one embodiment, the transaction handler (103) uses the account data (111) to store information for third party loyalty programs.

Figure 8:
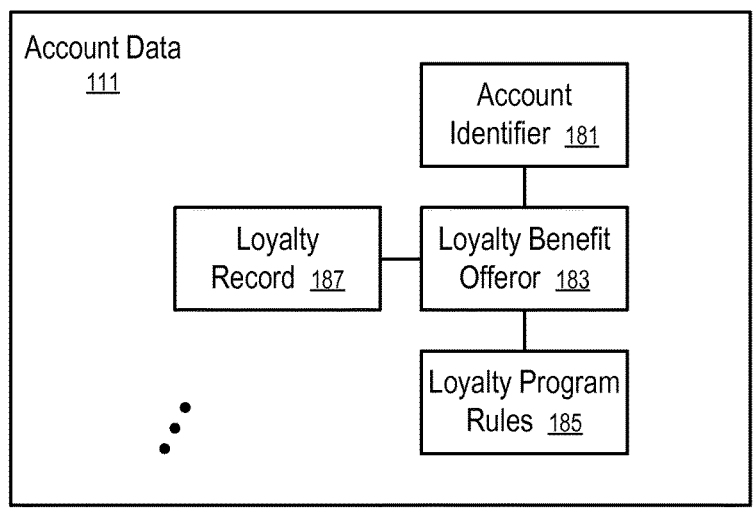
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

Figure 9:
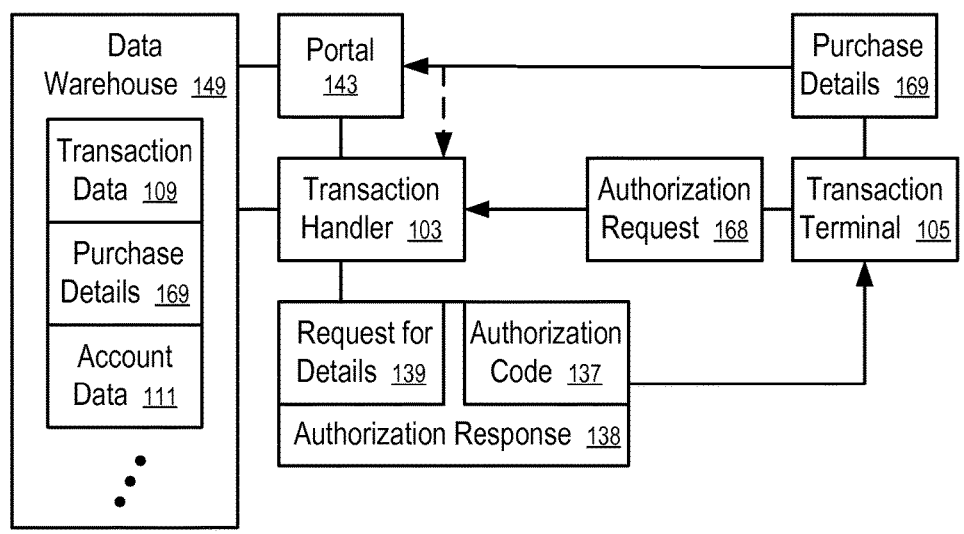
FIG. 9 shows a system to obtain purchase details according to one embodiment.

In one embodiment, the SKU level purchase details are requested from the merchants or retailers via authorization responses (e.g., as illustrated in FIG. 9), when the account (146) of the user (101) is enrolled in a loyalty program that allows the transaction handler (103) (and/or the issuer processor (145)) to collect the purchase details.

A method to provide loyalty programs of one embodiment includes the use of the transaction handler (103) as part of a computing apparatus. The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program. The computing apparatus provides to a customer (e.g., 101) an offer of a benefit when the customer satisfies a condition defined in the loyalty program, such as the loyalty program rules (185). In one embodiment, the loyalty benefit as identified in the loyalty record (187) can be redeemed in connection with a transaction in a way the benefit of an offer stored in association with the account identifier (181) is redeemed.

Examples of loyalty programs through collaboration between collaborative constituents in a payment processing system, including the transaction handler (103) in one embodiment are provided in U.S. patent application Ser. No. 11/767,202, filed Jun. 22, 2007, assigned U.S. Pat. App. Pub. No. 2008/0059302, and entitled "Loyalty Program Service," U.S. patent application Ser. No. 11/848,112, filed Aug. 30, 2007, assigned U.S. Pat. App. Pub. No. 2008/0059306, and entitled "Loyalty Program Incentive Determination," and U.S. patent application Ser. No. 11/848,179, filed Aug. 30, 2007, assigned U.S. Pat. App. Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned U.S. Pat. App. Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned U.S. Pat. App. Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned U.S. Pat. App. Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned U.S. Pat. App. Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned U.S. Pat. App. Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned U.S. Pat. App. Pub. No. 2010/0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009, assigned U.S. Pat. App. Pub. No. 2010/0114686, and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010, assigned U.S. Pat. App. Pub. No. 2011/0087530, and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the SKU level purchase details are requested from the merchants or retailers via authorization responses (e.g., as illustrated in FIG. 9), when the account (146) of the user (101) is enrolled in a program that allows the transaction handler (103) (and/or the issuer processor (145)) to collect the purchase details. Based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

Details on SKU-level profile in one embodiment are provided in U.S. patent application Ser. No. 12/899,144, filed Oct. 6, 2010, assigned U.S. Pat. App. Pub. No. 2011/0093335, and entitled "Systems and Methods for Advertising Services Based on an SKU-Level Profile," the disclosure of which is hereby incorporated herein by reference.

Purchase Details

In one embodiment, the transaction handler (103) is configured to selectively request purchase details via authorization responses. When the transaction handler (103) (and/or the issuer processor (145)) needs purchase details, such as identification of specific items purchased and/or their prices, the authorization responses transmitted from the transaction handler (103) is to include an indicator to request for the purchase details for the transaction that is being authorized. The merchants are to determine whether or not to submit purchase details based on whether or not there is a demand indicated in the authorization responses from the transaction handler (103).

FIG. 9 shows a system to obtain purchase details according to one embodiment. In FIG. 9, when the user (101) uses the consumer account (146) to make a payment for a purchase, the transaction terminal (105) of the merchant or retailer sends an authorization request (168) to the transaction handler (103). In response, an authorization response (138) is transmitted from the transaction handler (103) to the transaction terminal (105) to inform the merchant or retailer of the decision to approve or reject the payment request, as decided by the issuer processor (145) and/or the transaction handler (103). The authorization response (138) typically includes an authorization code (137) to identify the transaction and/or to signal that the transaction is approved.

In one embodiment, when the transaction is approved and there is a need for purchase details (169), the transaction handler (103) (or the issuer processor (145)) is to provide an indicator of the request (139) for purchase details in the authorization response (138). The optional request (139) allows the transaction handler (103) (and/or the issuer processor (145)) to request purchase details (169) from the merchant or retailer on demand. When the request (139) for purchase details is present in the authorization response (138), the transaction terminal (105) is to provide the purchase details (169) associated with the payment transaction to the transaction handler (103) directly or indirectly via the portal (143). When the request (139) is absent from the authorization response (138), the transaction terminal (105) does not have to provide the purchase details (169) for the payment transaction.

In one embodiment, prior to transmitting the authorization response (138), the transaction handler (103) (and/or the issuer processor (145)) determines whether there is a need for transaction details. When there is no need for the purchase details (169) for a payment transaction, the request (139) for purchase details (169) is not provided in the authorization response (138) for the payment transaction. When there is a need for the purchase details (169) for a payment transaction, the request (139) for purchase details is provided in the authorization response (138) for the payment transaction. The merchants or retailers do not have to send detailed purchase data to the transaction handler (103) when the authorization response message does not explicitly request detailed purchase data.

Offer Redemption

Figure 10:
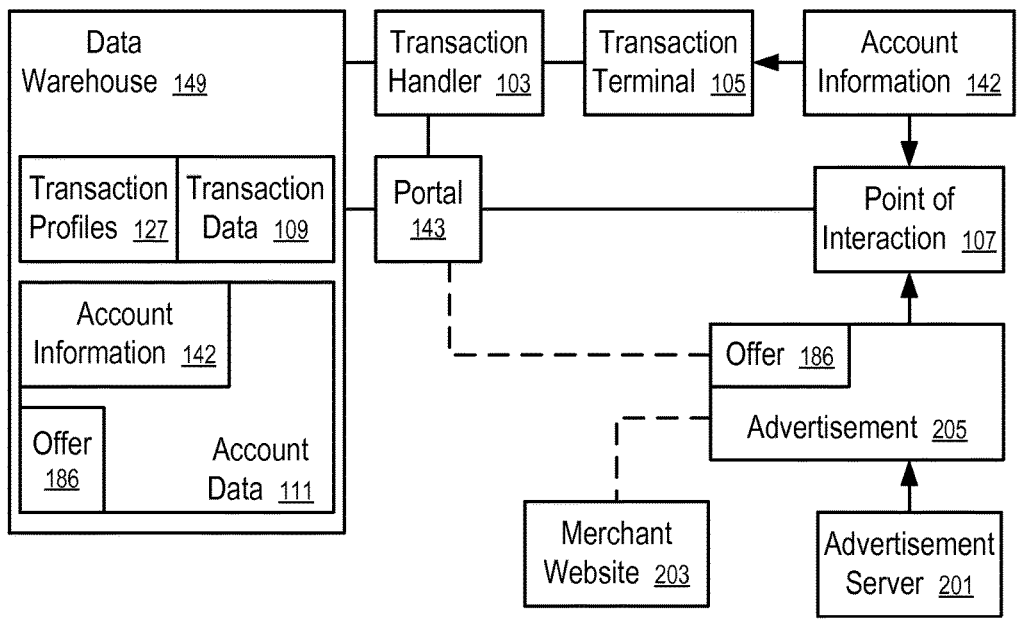
FIG. 10 shows a system to automate the processing of offers in response to purchases made in various channels according to one embodiment.

FIG. 10 shows a system to automate the processing of offers in response to purchases made in various channels according to one embodiment.

In FIG. 10, the transaction handler (103) has a portal (143) and a data warehouse (149) storing the transaction data (109) recording the transactions processed by the transaction handler (103). The advertisement server (201) is to provide an advertisement (205) to the point of interaction (107), such as a web browser of the user (101).

In FIG. 10, the advertisement (205) is to include a link to the merchant website (203) and an offer (186) with a link to the portal (143). When the link to the merchant website (203) is selected on the point of interaction (107), the user (101) is to visit the merchant website (203) for further details about the products and/or services of the merchant or advertiser. When the link to the portal (143) is selected, the offer (186) is identified to the portal (143) for association with a consumer account (146) of the user (101) identified by the account information (142).

In one embodiment, when the link to the portal (143) is selected, the user (101) is to provide the account information (142) to the portal (143) via the point of interaction (107) to identify the consumer account (146) of the user (101). After both the consumer account (146) of the user (101) and the offer (186) are identified, the data warehouse (149) is to store the data to associate offer (186) with the account information (142) in the account data (111) of the user (101).

In one embodiment, the account information (142) is pre-stored in the account data (111) of the user (101). The portal (143) is to authenticate the identity of the user (101) in response to the user selection of the link to the portal (143). After the user (101) is identified via authentication, the data warehouse (149) stores the data to associate offer (186) with the account information (142) in the account data (111) of the user (101).

In one embodiment, the account data (111) of the user (101) may have multiple consumer accounts (e.g., 146) under the control of one or more issuer processors (e.g., 145). When the user (101) has multiple consumer accounts (e.g., 146), the portal (143) is to prompt the user (101) to associate the offer (186) with one of the consumer accounts (e.g., 146). The transaction handler (103) and/or the portal (143) are to monitor the activity in the consumer account (e.g., 146) with which the offer (186) is associated to detect a transaction that qualifies for the redemption of the offer (186).

After the offer (186) is associated with account information (142), the transaction handler (103) and/or the portal (143) is to monitor the transaction activities in the corresponding consumer account (146) to detect one or more transactions that qualify for the redemption of the offer (186). For example, if the user (101) uses the account information (142) in the transaction terminal (105) to pay for a qualified purchase, the transaction handler (103) and/or the portal (143) is to identify the transaction from the multiplicity of transactions processed by the transaction handler (103) and to provide the benefit to the user (101) in accordance with the offer (186).

For example, in one embodiment, when processing a transaction at the transaction handler (103), the account information (142) involved in the transaction is checked to identify the associated offers (e.g., 186). If one or more offers (e.g., 186) are identified for the transaction, the transaction record for the transaction and/or other information about the transaction is used to determine if the redemption conditions of the offer (186) are met by the transaction.

If the redemption conditions of the offer (186) are met, the transaction handler (103) is to redeem the offer (186) on behalf of the user (101) via statement credits to the consumer account (146) identified by the account information (142).

In one embodiment, when the user (101) has multiple consumer accounts (e.g., 146), the transaction handler (103) and/or the portal (143) is to monitor the activity in the multiple consumer accounts to detect a transaction that qualifies for the redemption of the offer (186). When a qualified transaction is detected in a consumer account (146), the transaction handler (103) is to provide the statement credits to the consumer account (146) with which the offer (186) is associated to detect a transaction that qualifies for the redemption of the offer (186). In one embodiment, when the user (101) has multiple consumer accounts (e.g., 146), the portal (143) is to allow the user (101) to not associate the offer (186) with a particular consumer account; and when a qualified transaction is detected in an consumer account (146), the transaction handler (103) is to provide the statement credits to the consumer account (146) in which the qualified transaction occurred.

In one embodiment, the offer (186) is pre-registered in the data warehouse (149) prior to the delivery of the advertisement (205) from the advertisement sever (201) to the point of the interaction (107). For example, in one embodiment, the merchant or advertiser is to use the portal (143) to store data representing the offer (186) in the data warehouse (149). The data representing the offer (186) includes the specification of the benefit of the offer (186) and/or conditions for the redemption of the offer (186). In response, the portal (143) provides an identifier of the offer (186) to uniquely identify the offer (186) among a plurality of offers registered in the data warehouse (149). In one embodiment, the identifier of the offer (186) is included in the link to the portal (143) embedded in the advertisement (205). Thus, when the link containing the identifier of the offer (186) is selected, the identifier of the offer (186) is provided from the point of interaction (107) to the portal (143) to identify the offer (186).

In one embodiment, the pre-registration of the offer (186) in the data warehouse (149) by the merchant is not required. For example, the details of the offer (186), such as the specification of the benefit and the conditions for the redemption of the offer (186), are embedded in the link from the advertisement (205) to the portal (143). In one embodiment, the link from the advertisement (205) to the portal (143) includes a location from which the portal (143) can obtain the details of the offer (186). For example, in one embodiment, the details of the offer (186) are stored in the merchant website (203) and provided by the merchant website (203) via a web service. For example, in one embodiment, the details of the offer (186) are stored in the advertisement server (201), or a third party web service.

In FIG. 10, the advertisement (205) is provided by an advertisement server (201) that is distinct and separate from the portal (143). For example, the advertisement server (201) may be operated by a third party advertisement network, a search engine, a social networking website, an online marketplace, etc. In one embodiment, the advertisement (205) is presented in a web page of the advertisement server (201), such as in the search results of a search engine. In one embodiment, the advertisement (205) is presented in a web page of a third party media channel, such as a blog site, a social networking website, an online newspaper, etc. In one embodiment, the advertisement (205) is provided by the portal (143).

Figure 11:
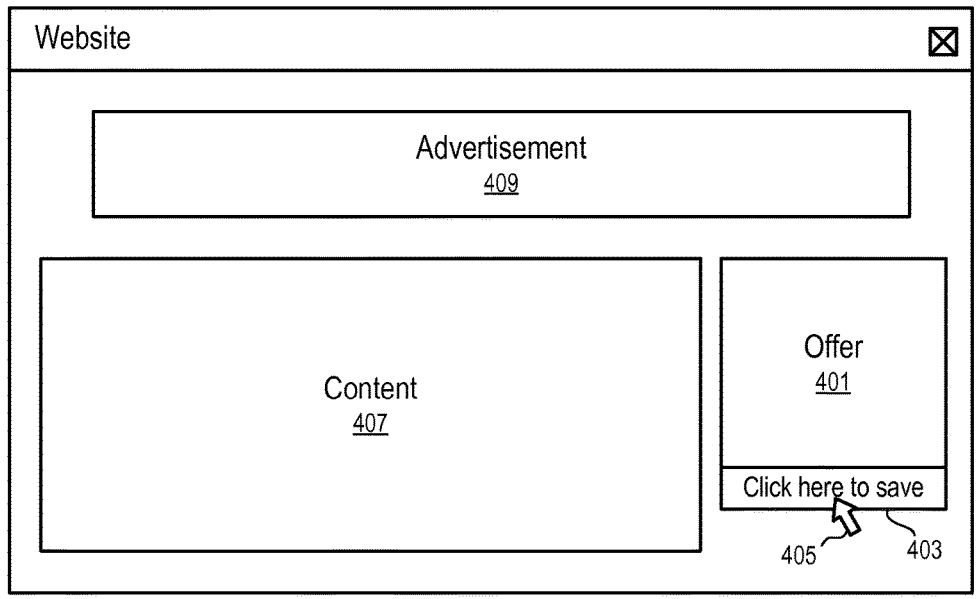
FIGS. 11-14 illustrate user interfaces for multi-channel offer redemption according to one embodiment.

FIGS. 11-14 illustrate user interfaces for multi-channel offer redemption according to one embodiment. In FIG. 11, the presentation of content (407) in a website is illustrated. The content (407) may be presented with one or more advertisements (e.g., 409 and 401). In FIG. 11, the advertisement providing the offer (401) also has a portion (403) which can be selected using a cursor (405) (or other selection mechanisms, such as touch screen, voice command, etc.)

Figure 12:
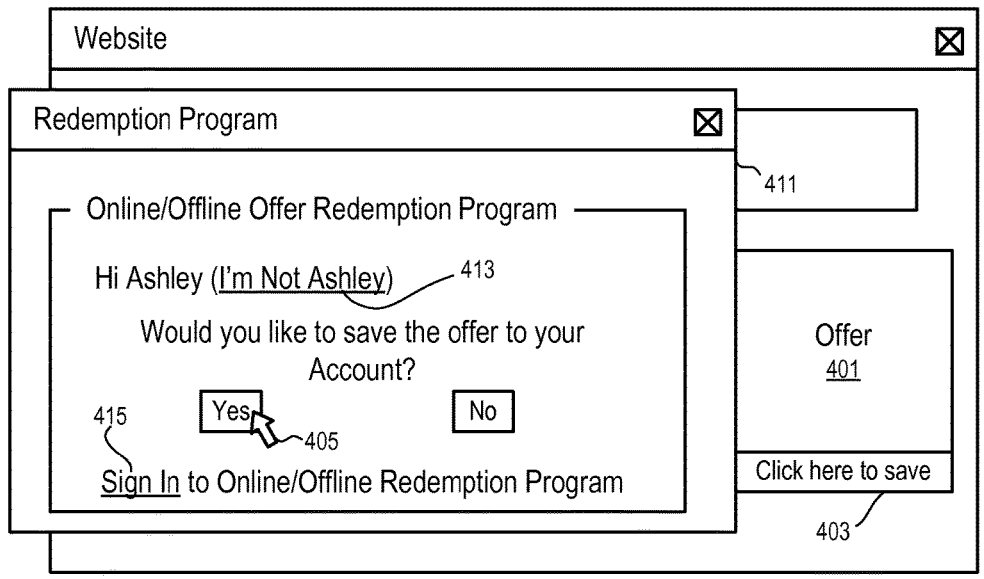

In one embodiment, when the portion (403) is selected as in FIG. 11, a user interface (411) as illustrated in FIG. 12 is presented to allow the user (101) to store the offer (401) on the web portal (143) (e.g., under the control of the transaction handler (103)).

The user (101) may have already logged into the web portal (143) using the web browser running on the point of interaction (107) (e.g., as Ashley illustrated in FIG. 12). After the user (101) has logged into the web portal (143) using the web browser, the web portal (143) may store a browser cookie in the web browser of the user (101) to identify the user (101). Based on the cookie returned from the web browser while the user (101) follows the link embedded in the portion (403) of the advertisement, the user interface (411) prompts the user (101) to confirm the storing of the offer (401) in the account.

In FIG. 12, the link (413) allows the user (101) to log into a different account to store the offer (401), if the account as indicated by the browser cookie is not the account of the user (101), or not the desired account of the user (101). If the user (101) does not already have an account with the web portal (143), the user (101) may follow the link (415 or 413) to sign into the web portal (143) as a new user.

Figure 13:
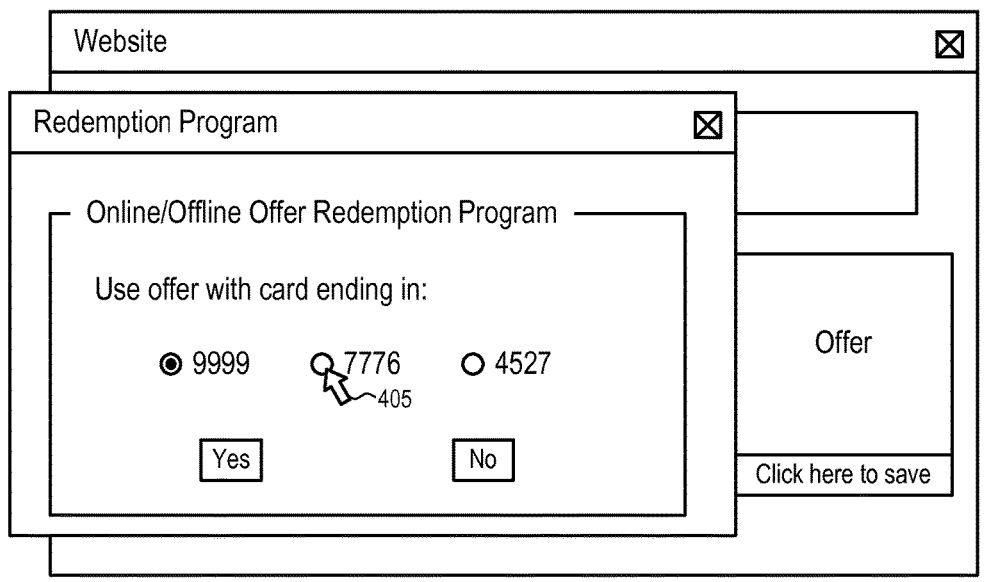

In one embodiment, the user (101) has multiple financial transaction cards supported by the web portal (143). The web portal (143) allows the user (101) to store the offer (401) with one of the financial transaction cards, as illustrated in FIG. 13. For example, in one embodiment, the user (101) may select the radio button using the cursor (405) to associate the offer (401) with the card having a number ending with "7776." When a transaction qualified for the offer (401) is made via the card that is associated with the offer (401), the web portal (143) is to automatically process the offer (401) for fulfillment/redemption.

In another embodiment, the offer (401) is stored in association with one or more (or all) of the cards identified in the account. Thus, the offer (401) can be redeemed in an automated way, when any of the associated cards is used to make the payment for the purchases that qualify for the offer (401).

Figure 14:
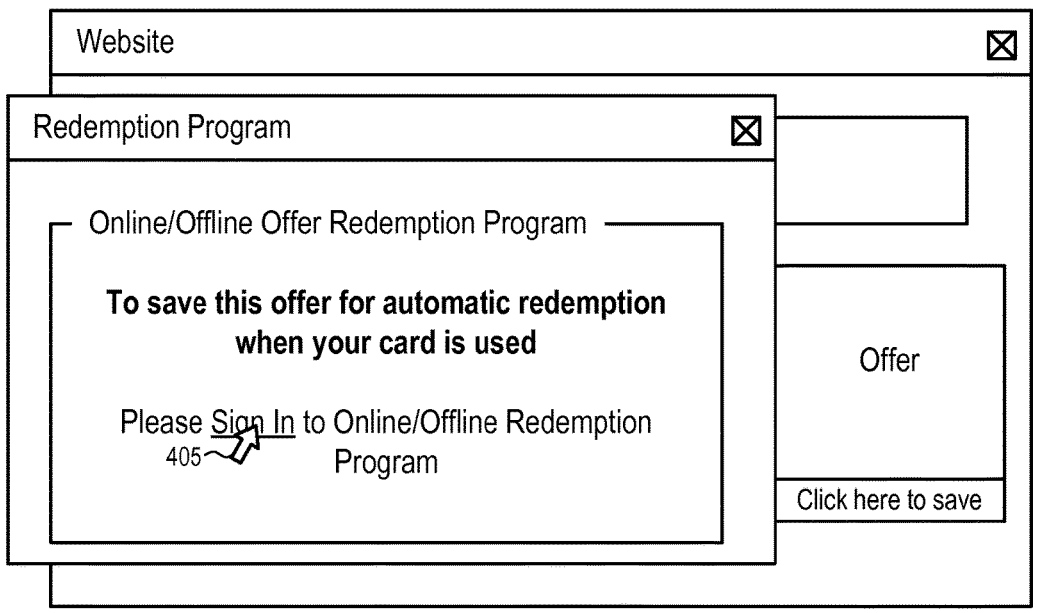

FIG. 14 illustrates a user interface to allow the user (101) to sign in as an existing user or a new user of the web portal (143), when the browser does not have a valid browser cookie to identify the consumer account (146) of the user (101).

Figure 15:
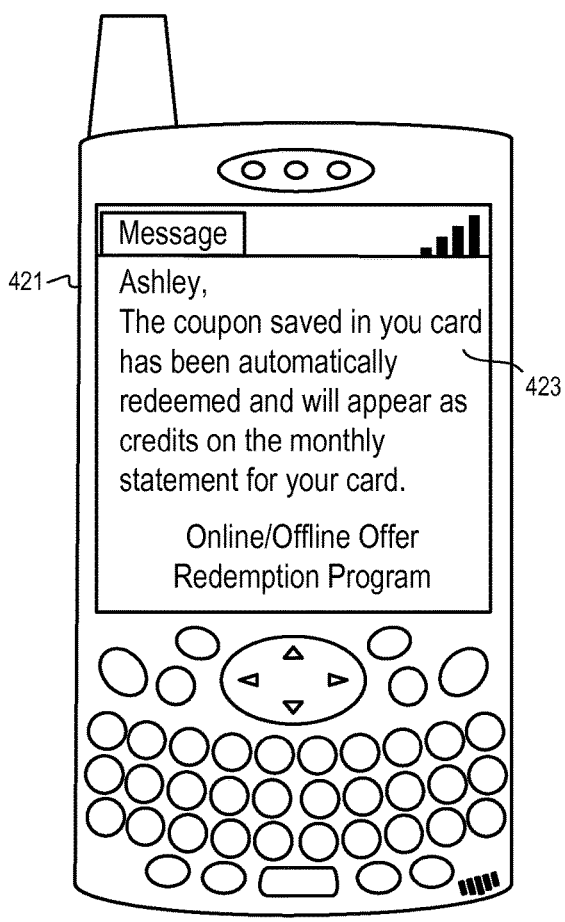
FIG. 15 illustrates a notification of offer redemption according to one embodiment.

FIG. 15 illustrates a notification of offer redemption according to one embodiment, in which a notification message (423) is sent to the mobile phone (421) of the user (101) via wireless telecommunication (e.g., short message service (SMS), multi-media messaging service (MMS), email, instant message, voice message, etc.). In one embodiment, the message (423) is sent to the user (101) while the transaction submitted from the transaction terminal (105) is being processed by the transaction handler (103).

Figure 16:
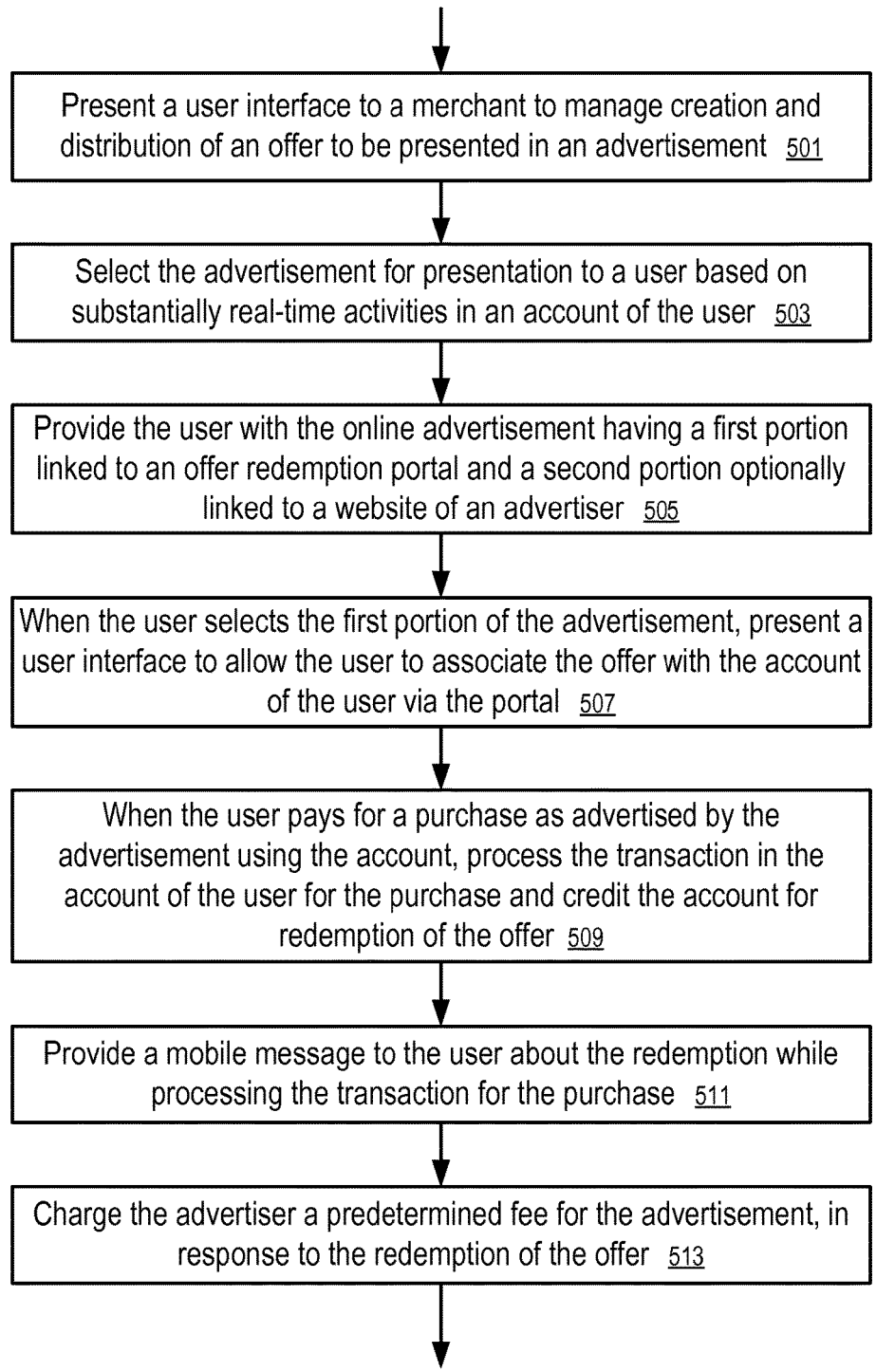
FIG. 16 illustrates a method for offer redemption according to one embodiment.

FIG. 16 illustrates a method for offer redemption according to one embodiment. In FIG. 16, a web portal (143) is designed to present (501) a user interface to a merchant to manage creation and distribution of an offer to be presented in an advertisement. A computer associated with web portal (143) is used to select (503) the advertisement for presentation to the user (101) based on substantially real-time activities in an account of the user (101). A web server is used to provide (505) the user (101) with the online advertisement having a first portion (403) linked to an offer redemption portal and a second portion (e.g., offer 401) optionally linked to a website of an advertiser. When the user (101) selects the first portion (403) of the advertisement, the web portal (143) presents (507) a user interface to allow the user (101) to associate the offer (401) with the account of the user (101). When the user (101) pays for a purchase as advertised by the advertisement using the account, the transaction handler (103) processes (509) the transaction in the account of the user (101) for the purchase and credits the account for redemption of the offer (401). The web portal (143) may provide (511) a mobile message to the user (101) about the redemption while processing the transaction for the purchase and charge (513) the advertiser a predetermined fee for the advertisement, in response to the redemption of the offer (401).

Figure 17:
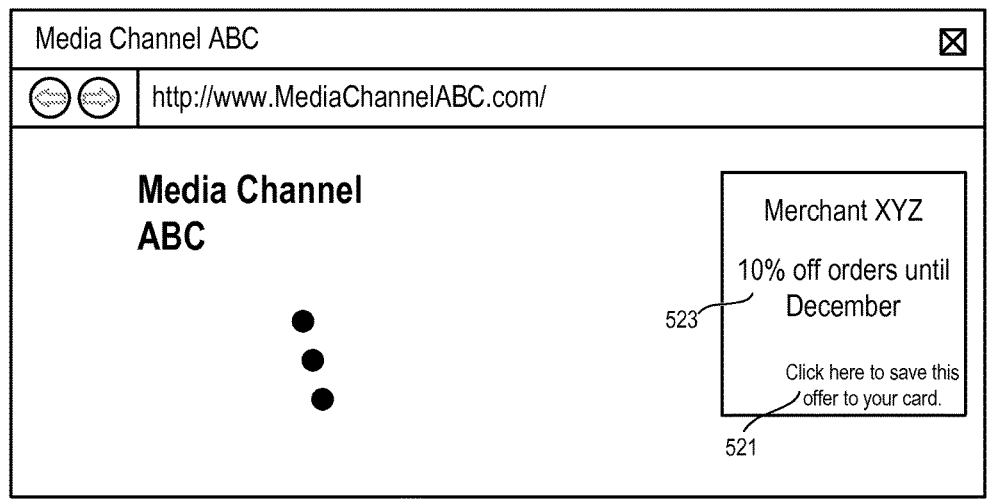
FIGS. 17-21 illustrate screen images of a user interface for offer redemption according to one embodiment.
Figure 18:
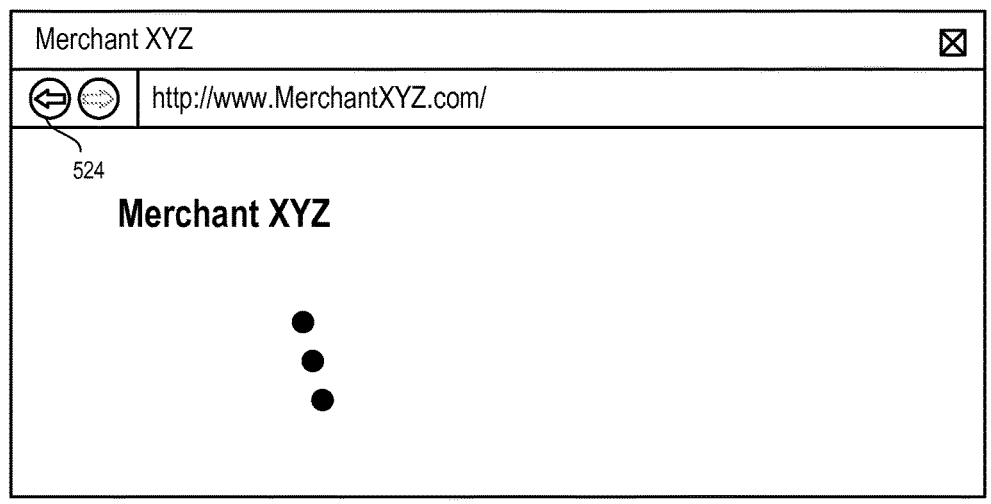
Figure 19:
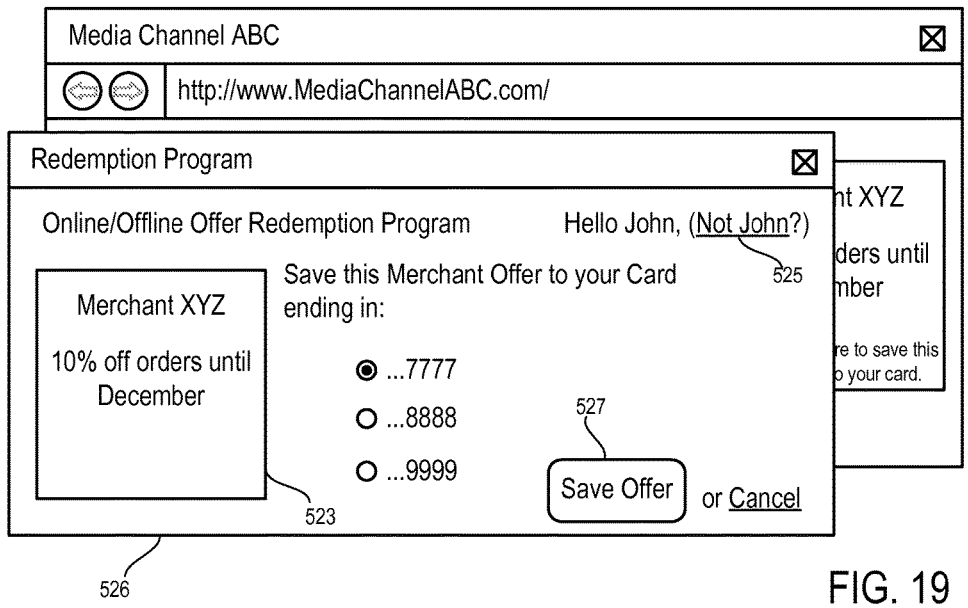
Figure 20:
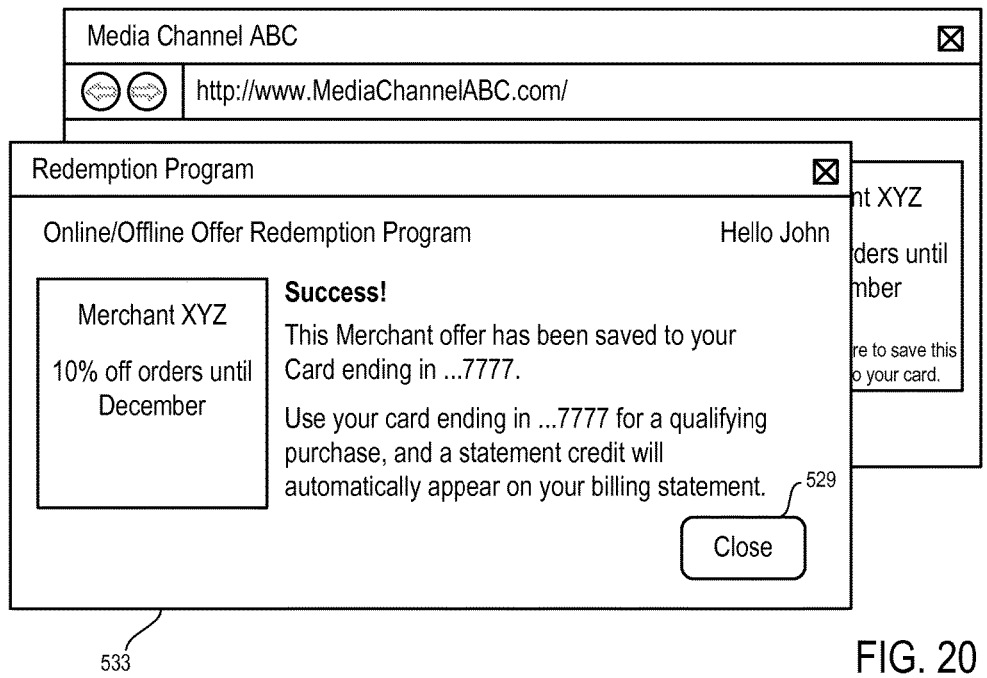

FIGS. 17-21 illustrate screen images of a user interface for offer redemption according to one embodiment. FIG. 17 illustrates an example when a user (101) arrives at a publisher site like Media Channel ABC. At the Media Channel ABC website, the user (101) sees a Merchant XYZ offer (523) with the insert (521) linked to the portal (143). When the user (101) clicks the advertisement/offer (523) (not the insert (521)), the user (101) is taken to the Merchant XYZ website, as illustrated in FIG. 18. At the Merchant XYZ website, as illustrated in FIG. 18, the user (101) can click the "back" button (524) of the browser to return to the Media Channel ABC webpage illustrated in FIG. 17. In FIG. 17, if the user (101) clicks on the insert (521) and the user (101) is recognized by the offer redemption site (e.g., via a browser cookie), the offer redemption site (e.g., hosted on the portal (143)) displays the user interface (526) in a separate window as illustrated in FIG. 19, which allows the user (101) to select a card of the user and save the offer (523) to the selected card. In FIG. 19, the advertisement/offer (523) is also displayed in the user interface (526) to store the offer (523), but without the insert (521). Once the user (101) clicks the "save" button (527), the offer redemption site displays a confirmation page as illustrated in FIG. 20.

In FIG. 20, the user (101) can click the "close" button (529) to close the window (533) and return to the Media Channel ABC website as illustrated in FIG. 20.

Figure 22:
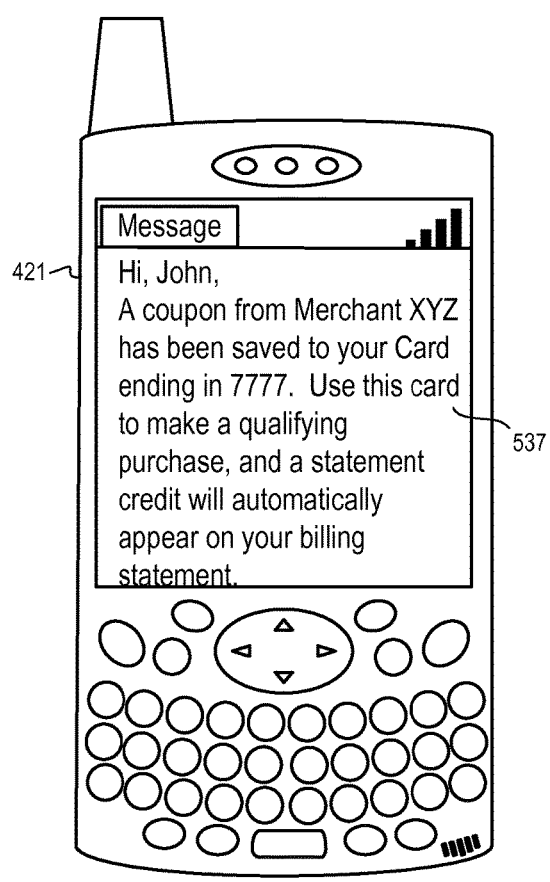
FIG. 22 shows an example to send a mobile message when an offer is saved according to one embodiment.

In one embodiment, the user (101) may also provide a phone number of a mobile phone (421) to the offer redemption site (e.g., as a user selected preference to receive mobile notification of saved offers); and once the offer (523) is saved with a card of the user (101), the offer redemption site can transmit a mobile message (537) to the user (101), as illustrated in FIG. 22.

Figure 21:
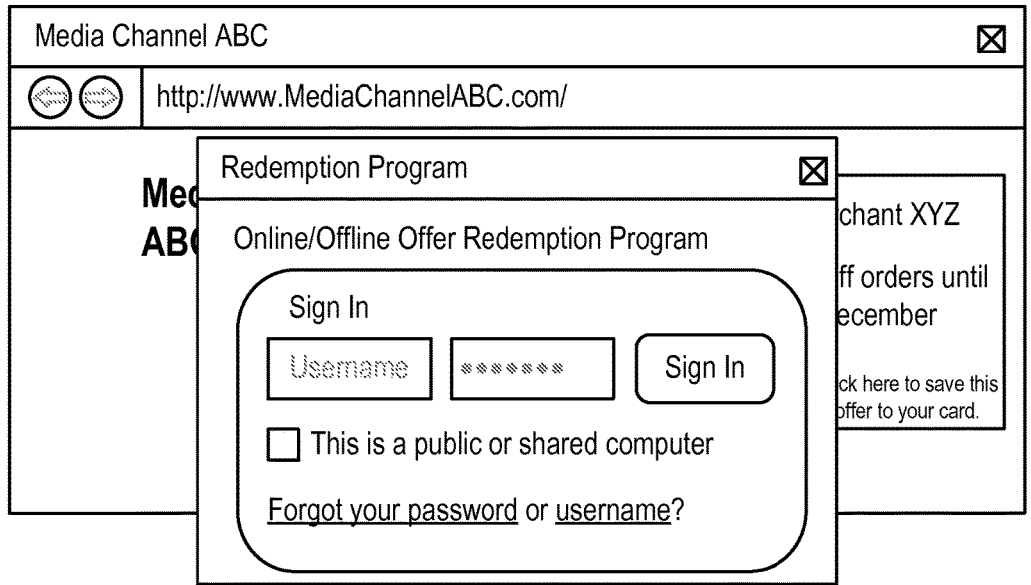

If the user (101) is not recognized by the offer redemption site (e.g., via a browser cookie), or the user (101) clicks the "not John" link (525) in FIG. 19 to sign in as a different user of the offer redemption site, the offer redemption site displays the web page (535) as illustrated in FIG. 21 to allow the user (101) to sign in and to have the browser store a browser cookie to identify the user (101).

Further details and examples of one embodiment of offer fulfillment are provided in U.S. patent application Ser. No. 13/113,710, filed May 23, 2011, assigned U.S. Pat. App. Pub. No. 2011/0288918, and entitled "Systems and Methods for Redemption of Offers," the disclosure of which is hereby incorporated herein by reference.

Apply Offer

The transaction handler (103) of one embodiment is configured to process authorization/settlement requests to enable to real time discount at transaction terminal (105) in accordance with the offer (186) stored, in association with the account data (111) of the user (101), in the data warehouse (149) of the transaction handler (103).

Figure 23:
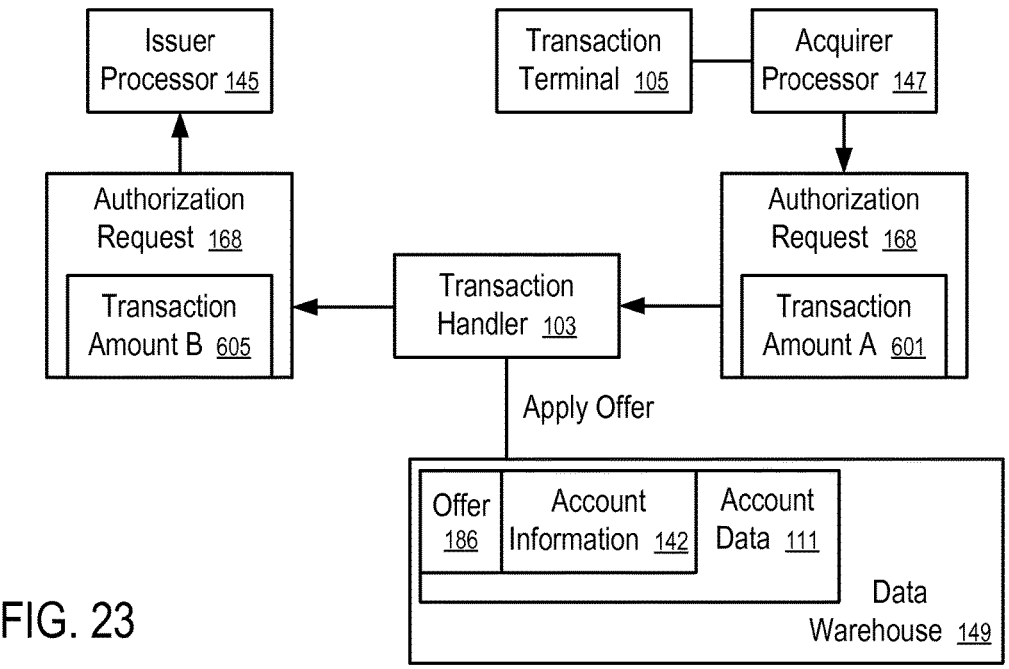
FIG. 23 shows a system to apply a discount offer via an authorization request according to one embodiment.

FIG. 23 shows a system to apply a discount offer via an authorization request according to one embodiment. In FIG. 23, the authorization request (168) from the acquirer processor (147) to the issuer processor (145) is modified by the transaction handler (103) to apply the offer (186) to the transaction that satisfies the requirements of the offer (186).

In FIG. 23, after the transaction handler (103) receives the authorization request (168) from the acquirer processor (147), the transaction handler (103) determines whether the offer (186) is applicable to the transaction associated with the authorization request (168). If the offer (186) is applicable, the transaction handler (103) changes the transaction amount A (601) to the transaction amount B (605) in the authorization request (168) transmitted to the issuer processor (145). If the issuer processor (145) authorizes the transaction amount B (605), the transaction handler (103) transmits to the transaction terminal (105), via the acquirer processor (147), the authorization response (138) to indicate the approval of the transaction amount B (605) and the applicable offer (186). The transaction terminal (105) is configured to accept the modified transaction amount B (605) and print the receipt that shows the applicable offer (186) and the application of the offer (186) to the transaction.

Figure 24:
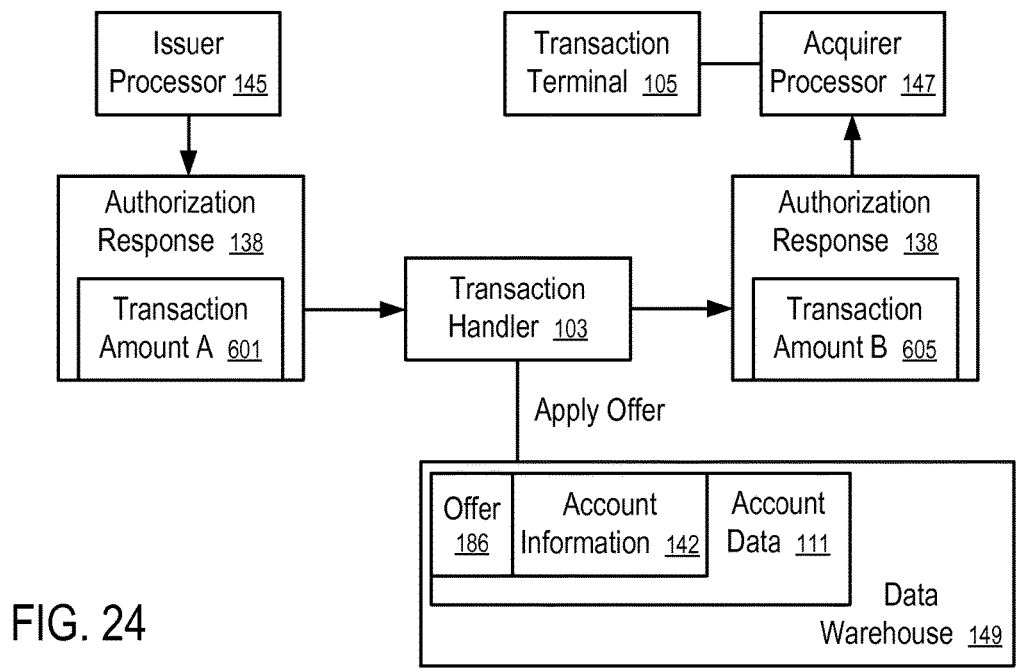
FIG. 24 shows a system to apply a discount offer via an authorization response according to one embodiment.

FIG. 24 shows a system to apply a discount offer via an authorization response according to one embodiment. In one embodiment, the authorization amount is not modified by transaction handler (103) during propagation of the authorization request (168) from the acquirer processor (147) to the issuer processor (145). In FIG. 24, the authorization response (138) from the issuer processor (145) to the acquirer processor (147) is modified by the transaction handler (103) to apply the offer (186) to the transaction that satisfies the requirements of the offer (186).

In FIG. 24, after the transaction handler (103) receives the authorization response (138) from the issuer processor (145), the transaction handler (103) determines whether the offer (186) is applicable to the transaction associated with the authorization response (138). If the offer (186) is applicable, the transaction handler (103) changes the transaction amount A (601) to the transaction amount B (605) in the authorization response (138) transmitted to the acquirer processor (147). In the embodiment, the authorization response (138) provided to the transaction terminal (105), via the acquirer processor (147), is further configured by the transaction handler (103) to indicate the applicable offer (186). The transaction terminal (105) is configured to accept the modify the transaction amount B (605), which is different from the initial transaction amount A (601) submitted by the transaction terminal (105) in the authorization request (168) to the acquirer processor (147), and print the receipt that shows the applicable offer (186) and the application of the offer (186) to the transaction.

In FIGS. 23 and 24, the transaction handler (103) is configured to apply the offer (186) during the authorization phase of the transaction to cause the receipt presented by the transaction terminal (105) to show that the benefit of the offer (186) has been applied to the transaction. For example, in one embodiment, the transaction terminal (105) is configured to provide a user interface that allows the merchant to accept the modified transaction amount (605) in view of the applicable offer (186) identified in the authorization response (138).

In one embodiment, the issuer processor (145) is configured to apply the offer (186) by change the authorization response (138).

In one embodiment, the acquirer processor (147) is configured to apply the offer (186) by change the authorization response (138) or the authorization request (168) (e.g., after receiving the authorization request (168) from the transaction terminal (105) and before transmitting the authorization request (168) having the modified transaction amount (605) to the transaction handler (103)).

In one embodiment, the transaction handler (103) further uses a communication reference (e.g., a mobile phone number, an email address, an instant message user identifier) that is stored in the account data (111) to provide a notification to the user (101) about the applicable offer (186) and the benefit of the offer (186) that has been applied to the transaction, in parallel with the processing of the authorization request (168) and/or the authorization response (138). Details and examples of using such a communication reference for notification in one embodiment are provided in U.S. patent application Ser. No. 13/152,186, filed Jun. 2, 2011, now U.S. Pat. No. 8,359,274, and entitled "Systems and Methods to Provide Messages in Real-Time with Transaction Processing," the disclosure of which is incorporated herein by reference in its entirety.

In one embodiment, the transaction handler (103) is configured to detect the applicability of the offer (186) during the settlement phase of the transaction and apply the applicable offer (186) during settlement of the transaction.

Figure 25:
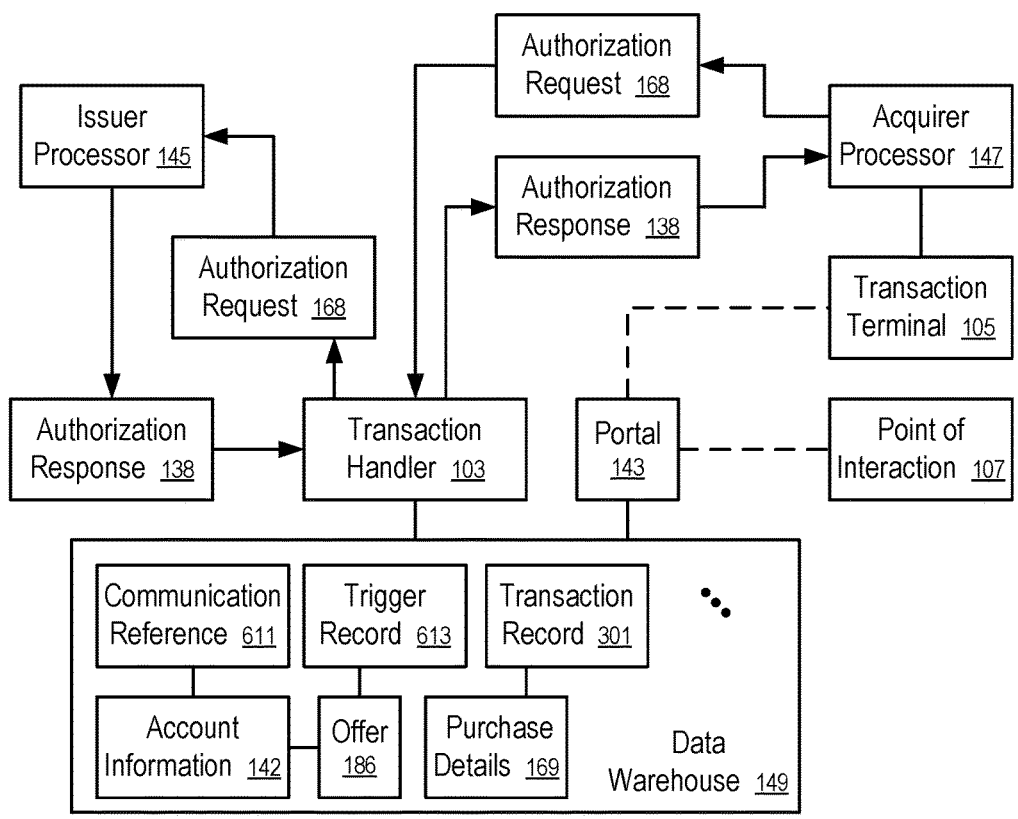
FIG. 25 shows a system to provide the benefit of an offer according to one embodiment.

FIG. 25 shows a system to provide the benefit of an offer according to one embodiment. In FIG. 25, the data warehouse (149) coupled with the transaction handler (103) and the portal (143) is configured to store data associating the offer (186) with the account information (142) of the consumer account (146).

In one embodiment, the portal (143) is configured with a user interface to allow the user (101) of the consumer account (146) specify a communication reference (611) that is stored in association with the account information (142). If the user (101) provides the communication reference (611) for association with the account information (142), the user (101) is provided with notification services using the communication reference (611). Examples of the communication reference (611) include a phone number for notification via voice mails, a mobile phone number for notification via short message service or mobile application, an email address for notification via emails, a user name in an instant messaging system for notification via instant messages, a member ID of a social networking site for notification via messages transmitted via the social networking site, etc.

In FIG. 25, the data warehouse (149) is configured with one or more trigger records associated with the offer (186). The trigger record (613) specifies a set of conditions and identifies an action, which is to be performed when a transaction processed by the transaction handler (103) satisfies the set of conditions.

In FIG. 25, when the account information (142) is used at the transaction terminal (105) (e.g., a point of sales device) to initiate a transaction in the consumer account (146), the transaction terminal (105) communicates with the acquirer processor (147) to generate an authorization request (168). The transaction handler (103) is configured to receive the authorization request (168) from the acquirer processor (147) and identify the issuer processor (145) based on the account information (142).

In FIG. 25, transaction handler (103) is configured to determine whether or not the offer (186) is applicable to the authorization request (168), after receiving the authorization request (168) from the acquirer processor (147) and prior to sending the corresponding authorization request (168) to the issuer processor (145) associated with the account information (142). If the offer is applicable to the transaction associated with the authorization request (168), the transaction handler (103) changes the transaction amount according to the offer (186) and uses the changed transaction amount to communicate with the issuer processor (145) for the authorization of the transaction, in a way as illustrated in FIG. 23.

In FIG. 25, the transaction terminal (105) is configured to present the information about the offer (186) provided in the authorization response (138). Thus, the user (101) can verify the application of the offer (186) to the transaction from the receipt produced by the transaction terminal (105). For example, the transaction terminal (105) uses a printer to produce a paper receipt.

In one embodiment, when the authorization response (138) received from the issuer processor (145) indicates the approval of the transaction that receives the benefit of the offer (186), the portal (143) is configured to use the communication reference (611) to send a notification to the point of interaction (107) of the user (101). The notification includes at least some of the above discussed information about the offer (186) that is applied to the authorization request (168) in the authorization response (138).

In FIG. 25, the application of the offer (186) is implemented via the transaction handler (103). Alternatively, the application of the offer (186) can be implemented in the acquirer processor (147), or the issuer processor (145), in a way similar to that described above in connection with the transaction handler (103).

Figure 26:
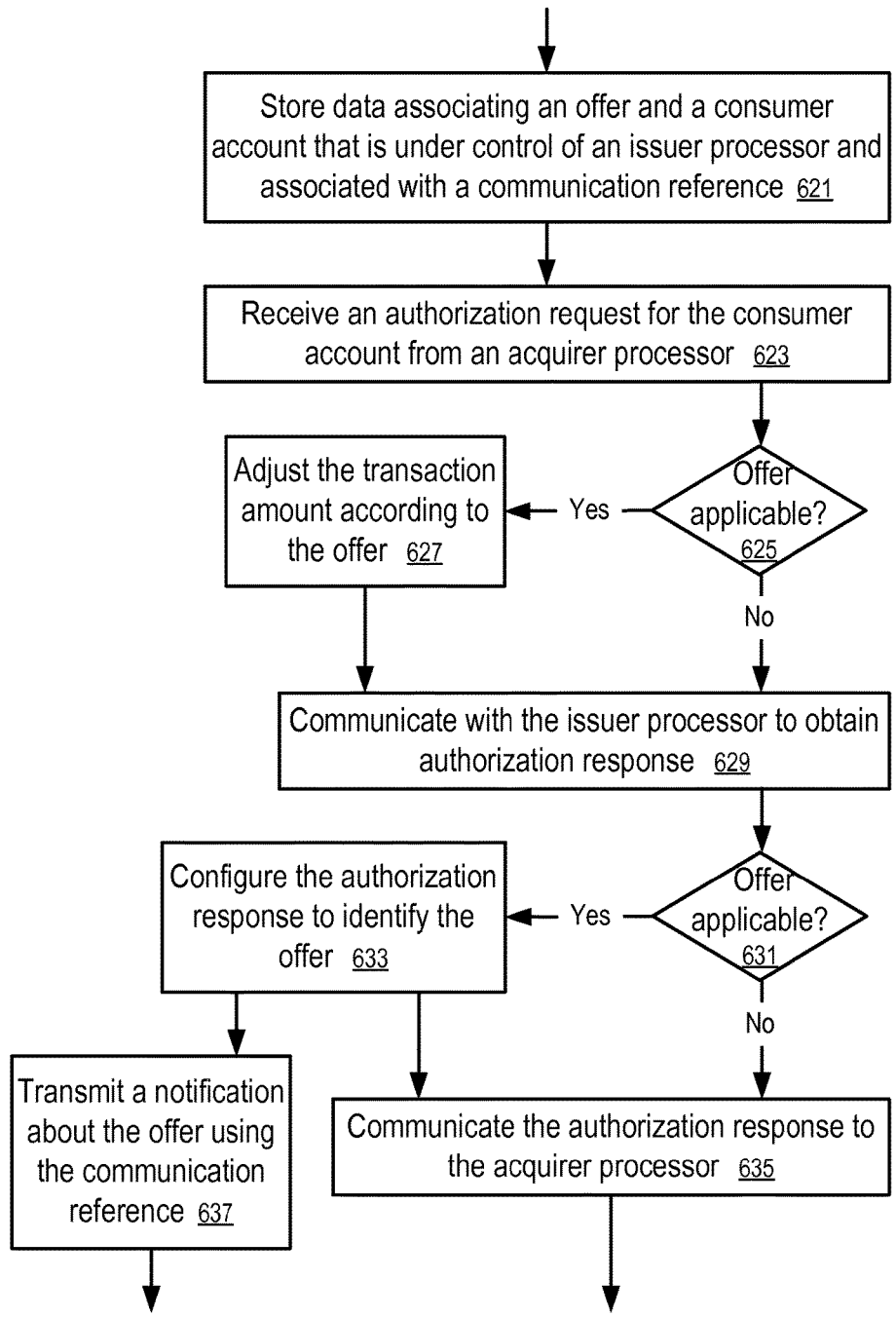
FIG. 26 shows a method to provide the benefit of an offer according to one embodiment.

FIG. 26 shows a method to provide the benefit of an offer according to one embodiment. In FIG. 26, a computing apparatus is configured to store (621) data associating an offer (186) and a consumer account (146) that is under control of an issuer processor (145) and associated with a communication reference (611), and receive (623) an authorization request (168) for the consumer account (146) from an acquirer processor (147). In response to the authorization request (168), the computing apparatus determines (625) whether the offer (186) is applicable; and if so, the computing apparatus adjusts (627) the transaction amount according to the offer (186) and communicates (629) with the issuer processor (145) to obtain authorization response (138).

Prior to communicating (635) the authorization response (138) to the transaction terminal (105) via the acquirer processor (147), the computing apparatus is configured to determine whether the offer (186) is applicable; and if so, the computing apparatus configures (633) the authorization response to identify the offer (186) and the benefit applied to the transaction in accordance with the offer (186) (e.g., the reduced transaction amount).

In one embodiment, when the authorization response approves the transaction, the computing apparatus is configured to optionally transmit (637) a notification about the offer (186) to the point of interaction (107) of the user (101) using the communication reference (611).

Further details and examples of applying offer benefit via adjusting transaction amount in some embodiments are provided in U.S. patent application Ser. No. 13/676,535, filed Nov. 14, 2012 and entitled "Systems and Methods to Provide Discount at Point of Sales Terminals," the disclosure of which is hereby incorporated herein by reference.

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010, assigned U.S. Pat. App. Pub. No. 2010/0174623, and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In FIG. 2, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

A "card-present" transaction typically involves physically presenting the account identification device (141), such as a financial transaction card, to the merchant (e.g., via swiping a credit card at a POS terminal of a merchant); and a "card-not-present" transaction typically involves presenting the account information (142) of the consumer account (146) to the merchant to identify the consumer account (146) without physically presenting the account identification device (141) to the merchant or the transaction terminal (105).

The transaction records (301) of one embodiment may further include details about the products and/or services involved in the purchase.

When there is voluminous data representing the transaction records (301), the spending patterns reflected in the transaction records (301) can be difficult to recognize by an ordinary person.

In FIG. 2, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAILS) code, or a similarly standardized category code). In other embodiments, an area may be identified by a product category, a SKU number, etc.

Examples of the spending frequency variables (313) and spending amount variables (315) defined for various merchant categories (e.g., 306) in one embodiment are provided in U.S. patent application Ser. No. 12/537,566, filed Aug. 7, 2009, assigned U.S. Pat. App. Pub. No. 2010/0306029, and entitled "Cardholder Clusters," and in U.S. patent application Ser. No. 12/777,173, filed May 10, 2010, assigned U.S. Pat. App. Pub. No. 2010/0306032, and entitled "Systems and Methods to Summarize Transaction Data," the disclosures of which applications are hereby incorporated herein by reference.

In FIG. 2, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

The transaction records (301) can be aggregated according to a buying entity, or a selling entity. For example, the aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular merchant having transactions with multiple accounts can be aggregated for a merchant level analysis. For example, the transaction records (301) for a particular merchant group can be aggregated for a merchant group level analysis. The aggregation (317) can be formed separately for different types of transactions, such as transactions made online, offline, via phone, and/or "card-present" transactions vs. "card-not-present" transactions, which can be used to identify the spending pattern differences among different types of transactions.

In FIG. 2, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

In FIG. 2, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In FIG. 2, a factor analysis (327) is performed to reduce the redundancy and/or correlation among the variables (e.g., 313, 315). The factor analysis (327) identifies the definitions (331) for factors, each of which represents a combination of the variables (e.g., 313, 315). A factor from the factor analysis (327) is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In general, an aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353); recurrent/installment transactions are combined (355); and account data are selected (357) according to a set of criteria related to activity, consistency, diversity, etc.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109).

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

Optionally, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Details about aggregated spending profile (341) in one embodiment are provided in U.S. patent application Ser. No. 12/777,173, filed May 10, 2010, assigned U.S. Pat. App. Pub. No. 2010/0306032, and entitled "Systems and Methods to Summarize Transaction Data," the disclosure of which is hereby incorporated herein by reference.

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. patent application Ser. No. 13/675,301, filed Nov. 13, 2012 and entitled "Systems and Methods to Summarize Transaction data," the disclosure of which is hereby incorporated herein by reference.

Transaction Processing and Data

FIG. 4 shows a system to provide information and/or services based on transaction data (109) according to one embodiment.

In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile (341), offer redemption notification, etc. The portal (143) may be implemented as a web portal, a telephone gateway, a file/data server, etc.

In FIG. 4, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 4, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 4, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 4, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser.

No. 12/191,796, filed Aug. 14, 2008, assigned U.S. Pat. App. Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. The transaction terminal (105) illustrated in FIG. 5 can be used in various systems discussed in connection with other figures of the present disclosure. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 7. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
receiving, in a portal, a request from a user to add a stored value account to a digital wallet of the user, the digital wallet comprising a first account of the user;
storing, in a data warehouse coupled to the portal, a stored value balance of the stored value account in association with an entire set of conditions which when satisfied allow a use of the stored value balance;
storing, in the data warehouse, an offer in association with the first account of the user and the stored value balance of the stored value account;

generating, in a transaction handler coupled to the data warehouse, a trigger record associated with a subset of the entire set of conditions, wherein the transaction handler is part of a payment processing network interconnecting issuer processors and acquirer processors;

receiving, in the transaction handler from a first acquirer processor of the acquirer processors over the payment processing network, an authorization request for a transaction in the first account, wherein the authorization request identifies a first transaction amount in the first account;

determining, by the transaction handler in response to the authorization request for the transaction in the first account, whether the transaction identified by the authorization request from the first acquirer processor satisfies the subset of the trigger record;

determining, by a processor separate from the transaction handler, in response to determining that the transaction satisfies the subset of the trigger record, whether the transaction identified by the authorization request from the first acquirer processor satisfies the entire set of conditions and the offer is applicable to the transaction identified by the authorization request from the first acquirer processor; and in response to a determination that the offer is applicable to the transaction identified by the authorization request from the first acquirer processor:
  determining, by the transaction handler, a benefit amount of the offer;
  determining, by the transaction handler, the stored value balance of the stored value account based on association of the offer with the first account of the user and the stored value balance of the stored value account;
  communicating, by the transaction handler, a second authorization request to an issuer processor of the stored value account for authorization for at least a portion of the stored value balance;
  receiving, in the transaction handler from the issuer processor of the stored value account, a first authorization response for the at least the portion of the stored value balance;
  determining, by the transaction handler, a second transaction amount in the first account by applying the benefit amount and the at least the portion of the stored value balance to the first transaction amount in accordance with the set of conditions which when satisfied allow the use of the stored value balance;
  communicating, by the transaction handler, a third authorization request to an issuer processor of the first account for authorization of the second transaction amount that is reduced from the first transaction amount;
  receiving, in the transaction handler from the issuer processor of the first account, a second authorization response for the second transaction amount; and
  communicating, by the transaction handler, a third authorization response to the first acquirer processor for the transaction based on the first authorization response and the second authorization response.

2. The method of claim 1, wherein the entire set of conditions identifies a set of one or more predetermined merchants with which the stored value balance is usable.

3. The method of claim 1, comprising:
storing a communication reference in association with the first account of the user; and transmitting a notification of a transaction amount reduction, reduced in accordance with the offer in the transaction, to the user at the communication reference associated with the first account of the user.

4. The method of claim 3, wherein the notification is transmitted in parallel with transmission of an authorization response for the authorization request received from the acquirer processor.

5. The method of claim 1, wherein the stored value account corresponds to a prepaid card.

6. The method of claim 1, wherein the stored value account can be used at a transaction terminal without the transaction handler.

7. The method of claim 6, further comprising:
receiving, in the portal, a communication from the issuer processor of the stored value account to associate the stored value balance with the first account of the user, in response to the request from the user; and
storing, in the data warehouse, data representing the stored value balance in association with the first account of the user for redemption via the transaction handler.

8. The method of claim 7, wherein after the storing of the data representing the stored value balance in association with the first account of the user, the data warehouse becomes a single master of a balance of the stored value account.

9. The method of claim 7, wherein after the storing of the data representing the stored value balance in association with the first account of the user, the issuer processor of the stored value account is configured to report a zero balance when the stored value account is used at the transaction terminal without going through the transaction handler.

10. The method of claim 7, wherein after the storing of the data representing the stored value balance in association with the first account of the user, the stored value balance is usable at the transaction terminal without going through the transaction handler; and the issuer processor of the stored value account and the transaction handler are configured to communicate with each other to maintain balance information for the stored value account.

11. A non-transitory computer-storage medium storing instructions configured to instruct a computing system to at least:
receive in a portal, a request from a user to add a stored value account to a digital wallet of the user, the digital wallet comprising a first account of the user;
store, in a data warehouse coupled to the portal, an offer and a balance of the stored value account in association with a first account of a user and an entire set of conditions which when satisfied allow a use of the stored value balance, the offer identifies the stored value account;
store, in the data warehouse, an offer in association with the first account of the user and the stored value balance of the stored value account;
generate, in a transaction handler coupled to the data warehouse, a trigger record associated with a subset of the entire set of conditions, wherein the transaction handler is part of a payment processing network interconnecting issuer processors and acquirer processors;
receive, in the transaction handler from a first acquirer processor of the acquirer processors over the payment processing network, an authorization request for a transaction in the first account, wherein the authorization request identifies a first transaction amount in the first account;

determine, by the transaction handler in response to the authorization request for the transaction in the first account, whether the transaction identified by the authorization request from the first acquirer processor satisfies the subset of the trigger record;

determine, by the computing apparatus a processor separate from the transaction handler, in response to determining that the transaction satisfies the subset of the trigger record, whether the transaction identified by the authorization request from the first acquirer processor satisfies the entire set of conditions and the offer is applicable to the transaction identified by the authorization request from the first acquirer processor; and in response to a determination that the offer is applicable to the transaction identified by the authorization request from the first acquirer processor:

determine, by the transaction handler, a benefit amount of the offer;

determine, by the transaction handler, the stored value balance of the stored value account based on association of the offer with the first account of the user and the stored value balance of the stored value account;

communicate, by the transaction handler, a second authorization request to an issuer processor of the stored value account for authorization for at least a portion of the stored value balance;

receive, in the transaction handler from the issuer processor of the stored value account, a first authorization response for the at least the portion of the stored value balance;

determine, by the transaction handler, a second transaction amount in the first account by applying the benefit amount and the at least the portion of the stored value balance to the first transaction amount in accordance with the set of conditions which when satisfied allow the use of the stored value balance;

communicate, by the transaction handler, a third authorization request to an issuer processor of the first account for authorization of the second transaction amount that is reduced from the first transaction amount;

receive, in the transaction handler from the issuer processor of the first account, a second authorization response for the second transaction amount; and communicate, by the transaction handler, a third authorization response to the first acquirer processor for the transaction based on the first authorization response and the second authorization response.

12. The non-transitory computer-storage medium of claim 11, wherein the offer is configured to require that the first transaction amount be larger than the balance of the stored value account.

13. A computing system, comprising:

a transaction handler configured to process transactions in a payment processing network interconnecting issuer processors and acquirer processors, including an issuer processor of a stored value account and an issuer processor of a consumer account of a user;

a processor separate from the transaction handler;

a data warehouse coupled to the transaction handler and configured to store data associating:
a communication reference of the user,
a balance of the stored value account,
an offer associated with the consumer account and the stored value account, and
the consumer account; and a portal coupled to the data warehouse and configured to communicate the offer to the user via the communication reference and communicate with the issuer processor of the stored value account to receive the balance of the stored value account and an entire set of conditions under which the stored value account is usable, in response to the user adding the stored value account to a digital wallet containing the consumer account;

wherein the transaction handler is configured to generate a trigger record associated with a subset of the entire set of conditions;

wherein the transaction handler is configured to receive, from a first acquirer processor of the acquirer processors over the payment processing network, an authorization request for a transaction in the consumer account, wherein the authorization request identifies a first transaction amount in the consumer account;

wherein the transaction handler is configured to determine, in response to the authorization request for the transaction in the consumer account, whether the transaction identified by the authorization request from the first acquirer processor satisfies the subset of the trigger record;

wherein the processor separate from the transaction handler is configured to determine, in response to determining that the transaction satisfies the subset of the trigger record, whether the transaction in the consumer account identified by the authorization request from the first acquirer processor satisfies the entire set of conditions and the offer is applicable to the transaction identified by the authorization request from the first acquirer processor; and in response to a determination that the offer is applicable to the transaction identified by the authorization request from the first acquirer processor, the transaction handler is configured to:

determine, by the transaction handler, a benefit amount of the offer;

determine, by the transaction handler, the stored value balance of the stored value account based on association of the offer with the first account of the user and the stored value balance of the stored value account;

communicate, by the transaction handler, a second authorization request to the issuer processor of the stored value account for authorization for at least a portion of the stored value balance;

receive, in the transaction handler from the issuer processor of the stored value account, a first authorization response for the at least the portion of the stored value balance;

determine, by the transaction handler, a second transaction amount in the consumer account by applying the benefit amount and the at least the portion of the stored value balance to the first transaction amount in accordance with the set of conditions under which the stored value account is usable;

communicate, by the transaction handler, a third authorization request to the issuer processor of the consumer account for authorization of the second transaction amount that is reduced from the first transaction amount;

receive, in the transaction handler from the issuer processor of the first account, a second authorization response for the second transaction amount; and communicate, by the transaction handler, a third authorization response to the first acquirer processor for the transaction based on the first authorization response and the second authorization response.

14. The computing system of claim 13, wherein the stored value account is limited to be used at a set of one or more predetermined merchants identified in merchant information received in the portal from the issuer processor.

15. The computing system of claim 14, wherein before the stored value account is associated with the consumer account, the stored value account is usable at a transaction terminal without going through the transaction handler; and after the stored value account is associated with the consumer account in the data warehouse, the issuer processor is configured to indicate that a balance of the stored value account is zero when the stored value account is used in a setting that does not involve the transaction handler.

16. The computing system of claim 13, wherein the benefit amount of the offer is funded by one of:
the merchant;
the issuer processor of the stored value account;
the issuer processor of the consumer account; and
the transaction handler.

17. The computing system of claim 13, wherein the transaction handler is configured to place a hold on the stored value balance when the issuer processor of the consumer account authorizes the second transaction amount in the consumer account.

* * * * *